United States Patent
Pham et al.

(10) Patent No.: US 12,529,564 B2
(45) Date of Patent: *Jan. 20, 2026

(54) INTERSECTION POSE DETECTION IN AUTONOMOUS MACHINE APPLICATIONS

(71) Applicant: NVIDIA Corporation, Santa Clara, CA (US)

(72) Inventors: Trung Pham, Santa Clara, CA (US); Hang Dou, Fremont, CA (US); Berta Rodriguez Hervas, San Francisco, CA (US); Minwoo Park, Saratoga, CA (US); Neda Cvijetic, East Palo Alto, CA (US); David Nister, Bellevue, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,894

(22) Filed: Mar. 25, 2024

(65) Prior Publication Data

US 2024/0230339 A1  Jul. 11, 2024

Related U.S. Application Data

(63) Continuation of application No. 16/848,102, filed on Apr. 14, 2020, now Pat. No. 12,013,244.

(Continued)

(51) Int. Cl.
  *G01C 21/26* (2006.01)
  *G05D 1/00* (2024.01)
  (Continued)

(52) U.S. Cl.
  CPC ........... *G01C 21/26* (2013.01); *G05D 1/0083* (2013.01); *G05D 1/0246* (2013.01); *G05D 1/249* (2024.01);
  (Continued)

(58) Field of Classification Search
  None
  See application file for complete search history.

(56) References Cited

U.S. PATENT DOCUMENTS

| 5,341,437 A | 8/1994 | Nakayama |
| 10,885,698 B2 | 1/2021 | Muthler et al. |
| (Continued) | | |

FOREIGN PATENT DOCUMENTS

| CN | 109253735 A | * 1/2019 | ......... G01C 21/3446 |
| JP | 6472504 B1 | 2/2019 | |
| (Continued) | | | |

OTHER PUBLICATIONS

Shapiro, Danny, "NVIDIA Acquires DeepMap, Enhancing Mapping Solutions for the AV Industry," Jun. 10, 2021, Nvidia, <https://blogs.nvidia.com/blog/nvidia-deepmap-mapping-drive-platform/> (Year: 2021).*

(Continued)

*Primary Examiner* — Madison R. Inserra
(74) *Attorney, Agent, or Firm* — Iron Summit IP LLP

(57) ABSTRACT

In various examples, live perception from sensors of a vehicle may be leveraged to generate potential paths for the vehicle to navigate an intersection in real-time or near real-time. For example, a deep neural network (DNN) may be trained to compute various outputs—such as heat maps corresponding to key points associated with the intersection, vector fields corresponding to directionality, heading, and offsets with respect to lanes, intensity maps corresponding to widths of lanes, and/or classifications corresponding to line segments of the intersection. The outputs may be decoded and/or otherwise post-processed to reconstruct an intersection—or key points corresponding thereto—and to determine proposed or potential paths for navigating the vehicle through the intersection.

20 Claims, 16 Drawing Sheets

Related U.S. Application Data

(60) Provisional application No. 62/839,155, filed on Apr. 26, 2019.

(51) Int. Cl.

| | | |
|---|---|---|
| *G05D 1/249* | (2024.01) | |
| *G05D 1/437* | (2024.01) | |
| *G06N 3/04* | (2023.01) | |
| *G06N 3/08* | (2023.01) | |
| *G06V 10/44* | (2022.01) | |
| *G06V 10/46* | (2022.01) | |
| *G06V 10/764* | (2022.01) | |
| *G06V 10/82* | (2022.01) | |
| *G06V 20/56* | (2022.01) | |

(52) U.S. Cl.
CPC ............... *G05D 1/437* (2024.01); *G06N 3/04* (2013.01); *G06N 3/08* (2013.01); *G06V 10/454* (2022.01); *G06V 10/462* (2022.01); *G06V 10/764* (2022.01); *G06V 10/82* (2022.01); *G06V 20/56* (2022.01); *G06F 2218/12* (2023.01)

(56) References Cited

U.S. PATENT DOCUMENTS

| | | | |
|---|---|---|---|
| 12,013,244 | B2 | 6/2024 | Pham et al. |
| 2009/0192686 | A1 | 7/2009 | Niehsen et al. |
| 2010/0098295 | A1 | 4/2010 | Zhang et al. |
| 2010/0191461 | A1 | 7/2010 | Zeng |
| 2013/0266175 | A1 | 10/2013 | Zhang et al. |
| 2015/0110344 | A1 | 4/2015 | Okumura |
| 2016/0102984 | A1* | 4/2016 | Dorum ............... G06F 16/22 701/409 |
| 2016/0325753 | A1 | 11/2016 | Stein et al. |
| 2017/0316333 | A1 | 11/2017 | Levinson et al. |
| 2017/0336793 | A1 | 11/2017 | Shashua et al. |
| 2018/0188041 | A1 | 7/2018 | Chen et al. |
| 2018/0189578 | A1 | 7/2018 | Yang et al. |
| 2018/0211373 | A1 | 7/2018 | Stoppa et al. |
| 2018/0268220 | A1 | 9/2018 | Lee et al. |
| 2019/0049968 | A1 | 2/2019 | Dean et al. |
| 2019/0122360 | A1 | 4/2019 | Zhang et al. |
| 2019/0272446 | A1* | 9/2019 | Kangaspunta ..... G01C 21/3859 |
| 2020/0026960 | A1* | 1/2020 | Park ..................... G05D 1/0088 |
| 2020/0104607 | A1 | 4/2020 | Kim et al. |
| 2020/0174481 | A1 | 6/2020 | Van Heukelom et al. |
| 2020/0257301 | A1 | 8/2020 | Weiser et al. |

FOREIGN PATENT DOCUMENTS

| | | | |
|---|---|---|---|
| JP | 2019056951 | A | 4/2019 |
| JP | 2020032994 | A | 3/2020 |
| WO | 2016183074 | A1 | 11/2016 |
| WO | 2019068291 | A1 | 4/2019 |

OTHER PUBLICATIONS

Nedevschi, Sergiu, et al., "Accurate Ego-Vehicle Global Localization at Intersections Through Alignment of Visual Data With Digital Map, " Jun. 2, 2013, IEEE Transactions on Intelligent Transportation Systems, vol. 14, No. 2, pp. 673-687 (Year: 2013).*
Papandreou, George, et al., "Towards Accurate Multi-person Pose Estimation in the Wild," 2017, IEEE, Proceedings of the IEEE Conference on Computer Vision and Pattern Recognition (CVPR), pp. 4903-4911 (Year: 2017).
Pham, Trung; Non-Final Office Action for U.S. Appl. No. 16/848,102, filed Apr. 14, 2020, mailed Sep. 9, 2022, 46 pgs.
IEC 61508, "Functional Safety of Electrical/Electronic/Programmable Electronic Safety-related Systems," https://en.wikipedia.org/wiki/IEC_61508, accessed on Apr. 1, 2022, 7 pgs.
ISO 26262, "Road vehicle—Functional safety," International standard for functional safety of electronic system, https://en.wikipedia.org/wiki/ISO_26262, accessed on Sep. 13, 2021, 8 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
Pham, Trung; Final Office Action for U.S. Appl. No. 16/848,102, filed Apr. 14, 2020, mailed Jan. 13, 2023, 37 pgs.
Invitation to pay additional fees received for PCT Application No. PCT/US2020/028116, mailed on Jul. 21, 2020, 12 pgs.
International Search Report and Written Opinion received for PCT Patent Application No. PCT/US2020/028116, mailed on Sep. 11, 2020, 17 pgs.
International Preliminary Report on Patentability received for PCT Application No. PCT/US2020/028116, mailed on Nov. 4, 2021, 14 pgs.
Pham, Trung; Non-Final Office Action for U.S. Appl. No. 16/848,102, filed Apr. 14, 2020, mailed May 18, 2023, 33 pgs.
Pham, Trung; Final Office Action for U.S. Appl. No. 16/848,102, filed Apr. 14, 2020, mailed Nov. 3, 2023, 31 pgs.
Pham, Trung; Advisory Action for U.S. Appl. No. 16/848,102, filed Apr. 14, 2020, mailed Dec. 28, 2023, 5 pgs.
Pham, Trung; Notice of Allowance for U.S. Appl. No. 16/848,102, filed Apr. 14, 2020, mailed Mar. 13, 2024, 18 pgs.
Pham, Trung; First Office Action for Chinese Patent Application No. 202080031631.3, filed Oct. 26, 2021, mailed Feb. 8, 2024, 9 pgs.
Pham, Trung, First Office Action for Japanese Patent Application No. 2021-563202, filed Oct. 25, 2021, mailed Nov. 30, 2023, 2 pgs.
Iijima, et al.; "Running Control of Electric Wheelchairs Using Intersection Recognition and Path Control," Journals of the Institutes of Systems, Control and Information Engineers, May 15, 2014, vol. 27, No. 5, 10 pgs.
Barnes, et al.; "Find your own way: Weakly-supervised segmentation of path proposals for urban autonomy," 2017 IEEE International Conference on Robotics and Automation (ICRA), USA, IEEE, May 2017, 8 pgs.
Pham, Trung; Second Office Action for Chinese Patent Application No. 202080031631.3, filed Oct. 26, 2021, mailed Jun. 17, 2024, 13 pgs. **English Abstract Included.
Pham, Trung; Third Office Action for Chinese Patent Application No. 202080031631.3, filed Oct. 26, 2021, mailed Aug. 14, 2024, 6 pgs. **English Abstract Included.
Phan, Trung; Notice of Registration for Chinese Patent Application No. 202080031631.3, filed Oct. 26, 2021, mailed Oct. 30, 2024, 5 pgs. **English Abstract Included.

* cited by examiner

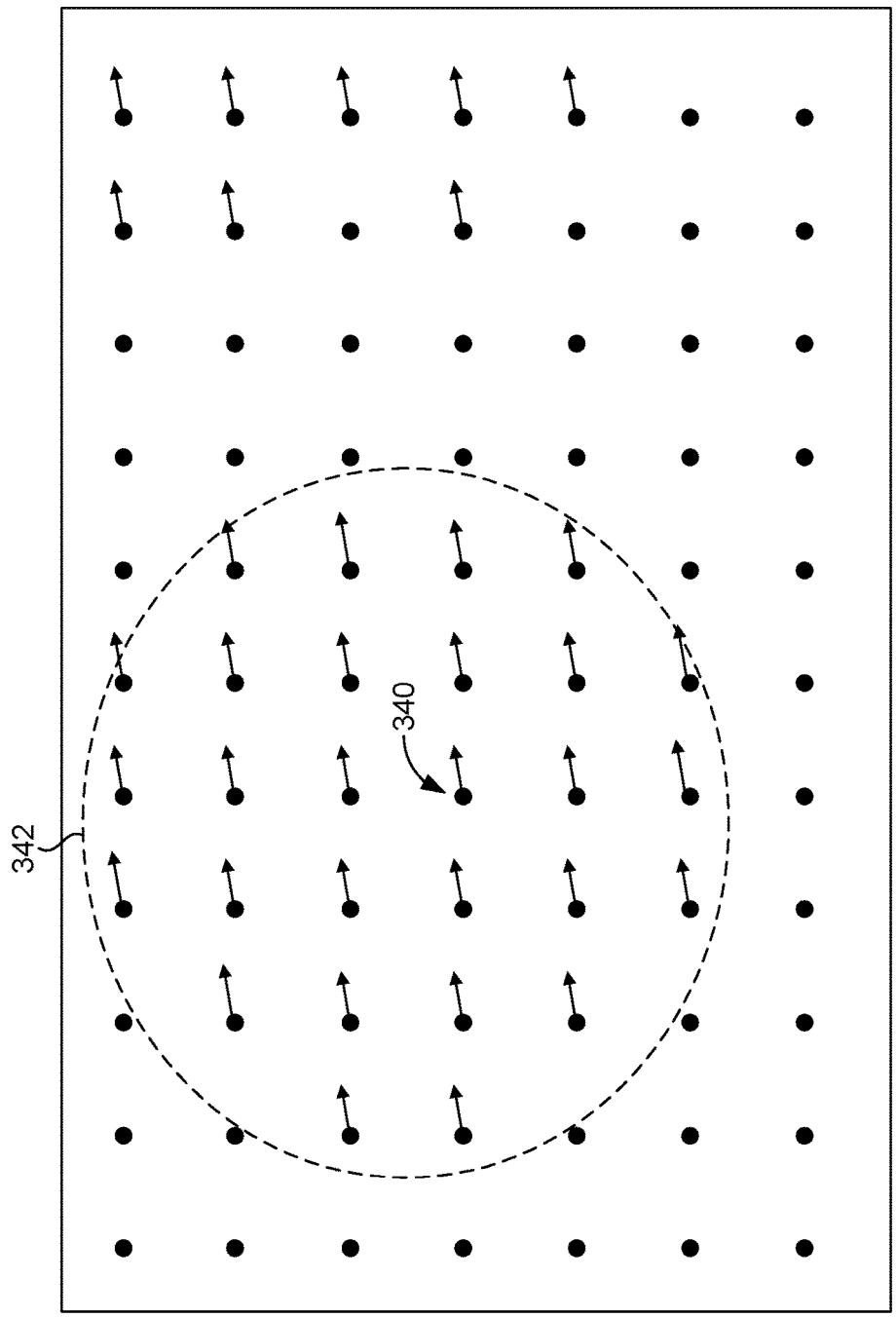

INTERSECTION POSE DETECTION IN AUTONOMOUS MACHINE APPLICATIONS

CROSS-REFERENCE TO RELATED APPLICATIONS

This application is a continuation of U.S. patent application Ser. No. 16/848,102, filed Apr. 14, 2020, which claims the benefit of U.S. Provisional Application No. 62/839,155, filed on Apr. 26, 2019. Each of which is hereby incorporated by reference in its entirety.

BACKGROUND

Autonomous driving systems and advanced driver assistance systems (ADAS) may leverage sensors, such as cameras, LIDAR sensors, RADAR sensors, and/or the like, to perform various tasks—such as lane keeping, lane changing, lane assignment, camera calibration, turning, path planning, and/or localization. For example, for autonomous and ADAS systems to operate independently and efficiently, an understanding of the surrounding environment of the vehicle must be achieved. This understanding may include information as to locations of objects, obstacles, lanes, intersections, and/or the like, and this information may be used by a vehicle when making path planning or control decisions—such as what path or trajectory to follow.

As an example, information regarding locations and layouts of intersections in an environment of an autonomous or semi-autonomous vehicle is important when making path planning, obstacle avoidance, and/or control decisions—such as where to stop, what path to use to safely traverse an intersection, where other vehicles or pedestrians may be located, and/or the like. This is particularly important when the vehicle is operating in urban and/or semi-urban driving environments, where intersection understanding and path planning becomes crucial due to the increased number of variables relative to a highway driving environment. For example, where a vehicle is to perform a left turn through an intersection in a bi-directional, multi-lane driving environment, determining locations of and directionality with respect to other lanes, as well as determining locations of crosswalks or bike paths, become critical to safe and effective autonomous and/or semi-autonomous driving.

In conventional systems, intersections may be interpolated from pre-stored high-definition (HD), three-dimensional (3D) maps for a vehicle. For example, the structure and orientation of intersections and the surrounding area may be gleaned from the HD map. However, such map-based solutions require accurate and detailed human labeling of each intersection to be navigated, in addition to labeling each intersection pose feature that may be relevant for every intersection. As a result, the more complex the intersection, the more annotations that are required, thereby increasing the complexity of accurately labeling intersections as well decreasing the scalability of intersection structure detection using map-based approaches. For example, the process can be logistically more complex when manual-labelling of larger or denser geographic regions (e.g., cities, states, countries) is required in order for the vehicle to be able to independently and effectively drive in varying regions.

SUMMARY

Embodiments of the present disclosure relate to intersection pose detection in autonomous machine applications. Systems and methods are disclosed that leverage outputs from various sensors of a vehicle to automatically detect and generate paths to navigate intersections in real-time or near real-time.

In contrast to conventional systems, such as those described above, the current system may use live perception of the vehicle to detect the intersection pose and generate paths for navigating the intersection. Key points (e.g., center points and/or end points) of line segments corresponding to features of an intersection—such as lanes, crosswalks, intersection entry or exit lines, bike paths, etc.—may be leveraged to generate potential paths for a vehicle to navigate an intersection. For example, machine learning algorithm(s)—such as deep neural networks (DNNs)—may be trained to compute information corresponding to an intersection—such as key points, heading directions, widths of lanes, number of lanes, etc.—and this information may be used to connect together center key points (e.g., key points corresponding to centers of line segments) to generate paths and/or trajectories for the vehicle to effectively and accurately navigate the intersection. As such, semantic information associated with the predicted key points—such as directionality, heading, width, and/or classification information corresponding to segments of the intersection—may be computed and leveraged in order to gain an understanding of the intersection pose. For example, the outputs of the DNN may be used to directly or indirectly (e.g., via decoding) determine: a location of each lane, bike path, cross-walk, and/or the like; a number of lanes associated with the intersection; a geometry of the lanes, bike paths, crosswalks, and/or the like; a direction of travel (or heading direction) corresponding to each lane; and/or other intersection structure information.

As a result of using live perception to generate an understanding of each intersection, the process of generating paths for navigating the intersection may be comparatively less time-consuming, less computationally intense, and more scalable as the system may learn to diagnose each intersection in real-time or near real-time, without requiring prior experience or knowledge of the intersection. As a result, the autonomous vehicle may be capable of traveling more freely through cities, urban environments, or other locations where HD maps may not be readily available or completely accurate.

BRIEF DESCRIPTION OF THE DRAWINGS

The present systems and methods for intersection pose detection in autonomous machine applications is described in detail below with reference to the attached drawing figures, wherein:

FIG. 3C is an illustration of a portion of an example vector field for encoding heading and/or directionality with respect to a lane or line segment, in accordance with some embodiments of the present disclosure;

DETAILED DESCRIPTION

Figure 1:
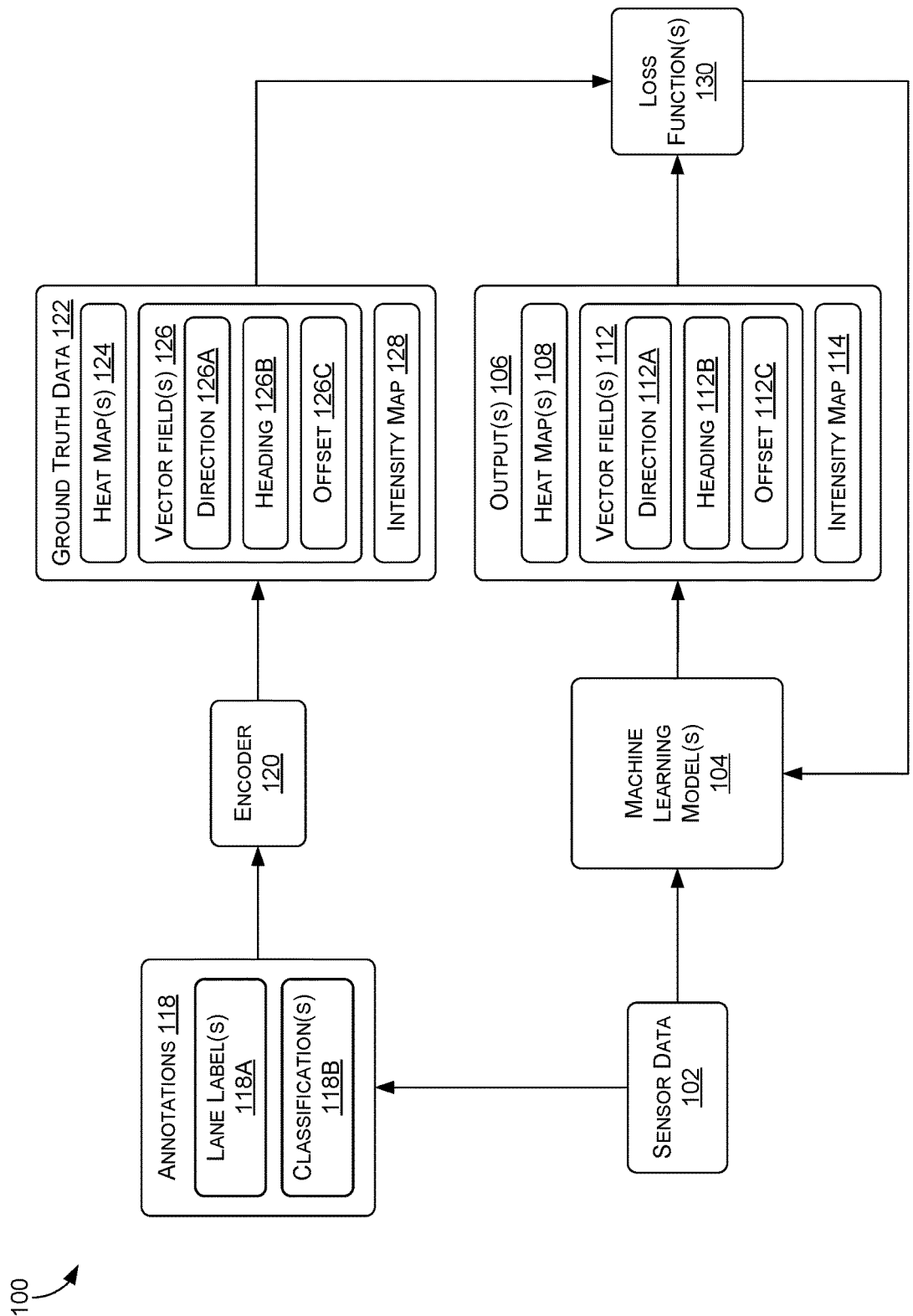
FIG. 1 is a data flow diagram illustrating an example process for training a neural network to detect intersection pose information for navigating intersections using outputs from sensors of a vehicle, in accordance with some embodiments of the present disclosure.

Systems and methods are disclosed related to intersection pose detection in autonomous machine applications. Although the present disclosure may be described with respect to an example autonomous vehicle 800 (alternatively referred to herein as "vehicle 800" or "autonomous vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with intersection structure for vehicle applications, this is not intended to be limiting, and the systems and methods described herein may be used in augmented reality, virtual reality, robotics, security and surveillance, autonomous or semi-autonomous machine applications, and/or any other technology spaces where detection of intersection or other environment structures and/or poses may be used.

As described herein, in contrast to conventional approaches of intersection structure and pose detection using high-definition (HD) maps, the current systems and methods provide techniques to detect and generate paths to navigate intersections using outputs from sensors (e.g., cameras, RADAR sensors, LIDAR sensors, etc.) of a vehicle in real-time or near real-time. As such, for each intersection, live perception of the vehicle may be used to detect the intersection pose and generate paths for navigating the intersection. To do this, embodiments of the present disclosure may leverage key points (e.g., mid points and/or end points) of line segments corresponding to lanes, cross walks, pedestrian crossings, etc. to generate one or more potential paths for a vehicle to navigate an intersection. Computer vision and/or machine learning algorithm(s) may be trained to detect the key points of an intersection, and the (center) key points may be connected together—using one or more filters—to generate paths and/or trajectories for the vehicle to effectively and accurately navigate the intersection. To generate the paths, directionality, heading, width, and/or semantic information corresponding to segments of the intersection may be computed and leveraged in order to gain an understanding of the intersection pose—e.g., location and number of lanes, direction of travel of each lane, etc. As such, by using perception to generate an understanding of each intersection, the process of generating paths for navigating the intersection may be comparatively less time-consuming, less computationally intense, and more scalable as the system may learn to diagnose each intersection in real-time or near real-time, without requiring prior experience or knowledge of the intersection. In some embodiments, these perception-based approaches may be performed in conjunction with map-based approaches to provide redundancy and further validate the results of the perception-based approach.

In deployment, sensor data (e.g., images, videos, etc.) may be received and/or generated using sensors (e.g., cameras, RADAR sensors, LIDAR sensors, etc.) located or otherwise disposed on an autonomous or semi-autonomous vehicle. The sensor data may be applied to a neural network (e.g., a deep neural network (DNN), such as a convolutional neural network (CNN)) that is trained to identify areas of interest pertaining to road markings, road boundaries, intersections, and/or the like (e.g., raised pavement markers, rumble strips, colored lane dividers, sidewalks, cross-walks, turn-offs, etc.) represented by the sensor data, as well as semantic and/or directional information pertaining thereto. More specifically, the neural network may be designed to compute key points corresponding to segments of an intersection (e.g., corresponding to lanes, bike paths, etc., and/or corresponding to features therein—such as cross walks, intersection entry points, intersection exit points, etc.), and to generate outputs identifying, for each key point, a width of a lane corresponding to the key point, a directionality of the lane, a heading corresponding to the lane, semantic information corresponding to the key point (e.g., crosswalk, crosswalk entry, crosswalk exit, intersection entry, intersection exit, etc., or a combination thereof), and/or other information. In some examples, the computed key points may be denoted by pixels represented by the sensor data where center and/or end points of intersection features are located, such as pedestrian crossing (e.g., crosswalks) entry lines, intersection entrance lines, intersection exit lines, and pedestrian crossing exit lines. As such, a structure and pose of the intersection may be determined using the key points and the related information, where the structure may include representations for lanes, lane types, key points, crosswalks, directionality, heading, and/or other information corresponding to the intersection.

The DNN may be trained to predict any number of different information—e.g., via any number of channels—that correspond to the intersection structure, orientation, and pose. For example, the channels may represent key point heat maps, offset vectors, directional vectors, heading vectors, number of lanes and lane types, width of lanes, and/or other channels. During training, the DNN may be trained with images or other sensor data representations labeled or annotated with line segments representing lanes, crosswalks, entry-lines, exit-lines, bike lanes, etc., and may further include semantic information corresponding thereto. The labeled line segments and semantic information may then be used by a ground truth encoder to generate key point heat maps, offset vector maps, directional vector maps, heading vector maps, lane width intensity maps, lane counts, lane classifications, and/or other information corresponding to the intersection as determined from the annotations. In some examples, key points may also include corner or end points of the line segments corresponding to lanes, which may be inferred from the center points, the line direction vectors, and/or width information, or may be computed directly using one or more vector fields corresponding to the end point key points. As a result, the intersection structure may be encoded using these key points with limited labeling required, as the information may be determined using the line segment annotations and associated semantic information.

As a result of different intersections including different numbers of associated key points, the ground truth data may be encoded using a number of different two-dimensional (2D) encoding maps such that each training image has the same ground truth dimensions (e.g., instead of creating some maximum number of key point predictions, and labeling non-existent key points as null). As an example, the heat maps described herein may be used to encode key point locations, where each key point may be represented by a non-normalized Gaussian distribution with the mean parameter equal to the key point location. However, unlike standard Gaussian heat maps, in some embodiments, a directional and adaptive variance Gaussian heat map may be encoded—where the variance is set according to the ground truth lane width in image-space and the covariance is computed from the ground truth line segment direction. For example, the heat map(s) may include an unnormalized normal distribution with a fixed standard deviation and/or an adaptive covariance.

In addition to heat maps for key point locations, two-dimensional (2D) vector fields may be used to encode heading directions and line directions. The 2D line directional vector fields and the 2D heading direction vector fields may be encoded by assigning a directional vector to the center key point, and then assigning the same directional vector to each pixel within a defined radius of the location of the center key point. The lane widths may be encoded by assigning an intensity value equal to the lane width normalized by image width, and the same intensity value may be assigned to other pixels within a defined radius. In some examples, the end point key points may be encoded using an offset vector field, such that the DNN learns to compute the location of not only the center key points, but also the end point key points. Using this information, the width of the lanes may be directly determined from the end point key points (e.g., a distance from one end point to the other), the directionality of the line segments extending across the lanes may be determined from the end point key points (e.g., the direction may be defined by a line from one end point to the other end point), and/or the heading direction may be determined from the end point key points (e.g., taking a normal from the directionality to define an angle, and using semantic information to determine the heading).

Moreover, because the 2D encoding channels may not have the same spatial resolution as the input image—e.g., because the image may be down sampled during processing by the DNN—smaller encoding channels may be used. To compensate for the loss of information during down sampling, offset vector fields may be encoded by assigning, for each pixel in an offset vector field, a vector pointing to the closest ground truth key point pixel location(s) (e.g., to the closet center key point, left end (or left edge) key point, and/or right end (or right edge) key point). This may allow the DNN to preserve the original location of the key points in the input image at the input spatial resolution.

Once the DNN is trained, the DNN may regress on outputs in the form of Gaussian heat maps, directional vector fields, heading vector fields, lane width density maps, semantic information, offset vector fields, and/or other outputs corresponding to the encoded ground truth channels the network is trained to predict, as described herein. As a result of the DNN outputs including heat maps, vector fields, density maps, and/or the like, the key points in the outputs may be represented by spatially distributed probability distributions which need to be post-processed into 2D coordinates that represent locations of key points (e.g., center key point, left end key point, and/or right end key points). In some embodiments, a peak finding algorithm may be applied to determine points with the highest probability within a sliding window of predetermined size. The end result may include a pixel location corresponding to a probability distribution peak, achieved through non-maximum suppression. The 2D locations of the surviving peak probability points may be output—e.g., using a post-processing module—along with corresponding semantic information as determined by the DNN-based classification. In some embodiments, the points may be further filtered to remove overlap using non-maximum suppression or another filtering algorithm.

The final outputs of the DNN and the post-processing module may include the key points with corresponding semantic classification in 2D image-space. These 2D image-space points may be used to determine three-dimensional (3D) world-space coordinates for the key-points, to aid the vehicle in navigating through the world-space environment. In some embodiments, however, the DNN may be trained on 3D data to predict locations in 3D world-space.

Once the key points are outputted by the DNN, and the 3D locations are determined, any number of additional post-processing steps may be performed in order to ultimately "connect the dots (or key points)" and generate paths for navigating an intersection. For example, the center key points may be connected to generate polylines that represent potential paths for traversing the intersection. The final paths may be assigned path types, which may be determined relative to the position of the vehicle, the location of the key points, and/or the heading vectors (e.g., angles). Potential path types include left turn, right turn, switch lanes, and/or continue in lane. Curve fitting may also be implemented in order to determine final shapes that most accurately reflect a natural curve of the potential paths. Curve fitting may be performed using polyline fitting, polynomial fitting, clothoid fitting, and/or other types of curve-fitting algorithms. The shape of the potential paths may be determined based on the locations and heading vectors (e.g., angles) associated with the key points to be connected. In embodiments, the shape of a potential path may be aligned with a tangent of the heading vector. The curve fitting process may be repeated for all key points that may potentially be connected to each other to generate all possible paths the vehicle can take to navigate the intersection. In some examples, non-feasible paths may be removed from consideration based on traffic rules and physical restrictions associated with such paths.

In some embodiments, a matching algorithm may be used to connect the key points and generate potential paths for the vehicle to navigate the intersection. In such examples, matching scores may be determined for each pair of key points based on the location of the key points, heading vectors, and the shape of the fitted curve between the pair of key points. In some examples, a linear matching algorithm—such as a Hungarian matching algorithm—may be used. In other examples, a non-linear matching algorithm—such as a spectral matching algorithm—may be used to connect a pair of key points.

In either example, once the paths through the intersection are determined, this information may be used to perform one or more operations by the vehicle. For example, a world model manager may update the world model for aid in navigating the intersection, a path planning layer of an autonomous driving software stack may use the intersection information to determine the path through the intersection (e.g., along one of the determined potential paths), and/or a control component may determine controls of the vehicle for navigating the intersection according to a determined path.

With reference to FIG. 1, FIG. 1 is an example data flow diagram illustrating an example process 100 for training a neural network to detect intersection structure and pose using outputs from one or more sensors of a vehicle, in accordance with some embodiments of the present disclosure. It should be understood that this and other arrangements described herein are set forth only as examples. At a high level, the process 100 may include one or more machine learning model(s) 104 receiving one or more inputs, such as sensor data 102, and generating one or more outputs, such as one or more output(s) 106. In some examples, when used for training, the sensor data 102 may be referred to as training data. Although the sensor data 102 is primarily discussed with respect to image data representative of images, this is not intended to be limiting, and the sensor data 102 may include other types of sensor data used for intersection pose detection, such as LIDAR data, SONAR data, RADAR data, and/or the like—e.g., as generated by one or more sensors of the vehicle 800 (FIGS. 8A-8D).

The process 100 may include generating and/or receiving sensor data 102 from one or more sensors. The sensor data 102 may be received, as a non-limiting example, from one or more sensors of a vehicle (e.g., vehicle 800 of FIGS. 8A-8C and described herein). The sensor data 102 may be used by the vehicle, and within the process 100, to detect and generate paths to navigate intersections in real-time or near real-time. The sensor data 102 may include, without limitation, sensor data 102 from any of the sensors of the vehicle including, for example and with reference to FIGS. 8A-8C, global navigation satellite systems (GNSS) sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 876, stereo camera(s) 868, wide-view camera(s) 870 (e.g., fisheye cameras), infrared camera(s) 872, surround camera(s) 874 (e.g., 360 degree cameras), long-range and/or mid-range camera(s) 878, speed sensor(s) 844 (e.g., for measuring the speed of the vehicle 800), and/or other sensor types. As another example, the sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 104 described herein may be tested, trained, and/or validated using simulated data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 used for training may include original images (e.g., as captured by one or more image sensors), down-sampled images, up-sampled images, cropped or region of interest (ROI) images, otherwise augmented images, and/or a combination thereof. The machine learning model(s) 104 may be trained using the images (and/or other sensor data 102) as well as corresponding ground truth data 122. The ground truth data 122 may include annotations, labels, masks, maps, and/or the like. For example, in some embodiments, the ground truth data 122 may include an intensity map(s) 128, heat map(s) 124, and/or one or more vector fields 126—such as a direction vector field 126A, a heading vector field 126B, and/or an offset vector field 126C. An encoder 120 may use the annotations 118 to encode the ground truth data 122. In some embodiments, the annotations 118 may include lane label(s) 118A and classification(s) 118B of the lane label(s) 118A.

With reference to the annotations 118, the annotations 118 may be generated within a drawing program (e.g., an annotation program), a computer aided design (CAD) program, a labeling program, another type of program suitable for generating the annotations 118 and/or other of the ground truth data 122, and/or may be hand drawn, in some examples. In any example, the annotations 118 and/or the ground truth data 122 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of lane, machine generates lanes).

The lane (or line) label(s) 118A may include annotations, or other label types, corresponding to features or areas of interest corresponding to the intersection. In some examples, an intersection structure may be defined as a set of line segments corresponding to lanes, crosswalks, entry-lines, exit-lines, bike lanes, etc., in the sensor data 102. The line segments may be generated as polylines, with a center of each polyline defined as the center for the corresponding line segment. The classification(s) 118B may be generated for each of the images (or other data representations) and/or for each one or more of the line segments and centers in the images represented by the sensor data 102 used for training the machine learning model(s) 104. The number of classification(s) 118B may correspond to the number and/or types of features that the machine learning model(s) 104 is trained to predict, or to the number of lanes and/or types of features in the respective image. Depending on the embodiment, the classification(s) 118B may correspond to classifications or tags corresponding to the feature type, such as but not limited to, crosswalk, crosswalk entry, crosswalk exit, intersection entry, intersection exit, and/or bike lane.

In some examples, the intersection structure may be determined based on the annotations 118. In such examples, a set of key points may be determined from the lane labels 118A, with each key point corresponding to a center (or left edge, or right edge, etc.) of a corresponding lane. Although key points are described primarily with respect to center points of lanes segments, this is not intended to be limiting, and in some examples corner or end-points of each lane may also be determined as key points for respective instances of the sensor data 102. For example, corner or end-points of each the lanes may be inferred from center key points and the directionality of the lane, or from the lane labels 118 themselves. In addition, a number of lanes as well as a heading, directionality, width, and/or other geometry corresponding to each lane may be determined from the annotations 118—e.g., from the lane label(s) 118A and the classification(s) 118B. As a result, even though the annotations 118 may not directly indicate certain intersection structure or pose information—such as heading direction, lane width, and/or directionality of the lane—the annotations 118 may be analyzed to determine this information.

For example, where a first lane label 118A extends along the width of the lane and includes a classification of "crosswalk entry" and a second lane label 118A extends along the width of the same lane and includes a classification of "crosswalk exit_intersection entry," the heading direction of the lane (e.g., from the first lane label to the second lane label) may be determined using this information (e.g., a vehicle would travel in a direction across the first lane label toward the second lane label). In addition, the lane labels 118A may indicate the directionality of the lane (e.g., the angle), and from this information the heading direction (e.g., angle) may be determined—such as by computing the normal of the lane label 118.

Figure 2A:
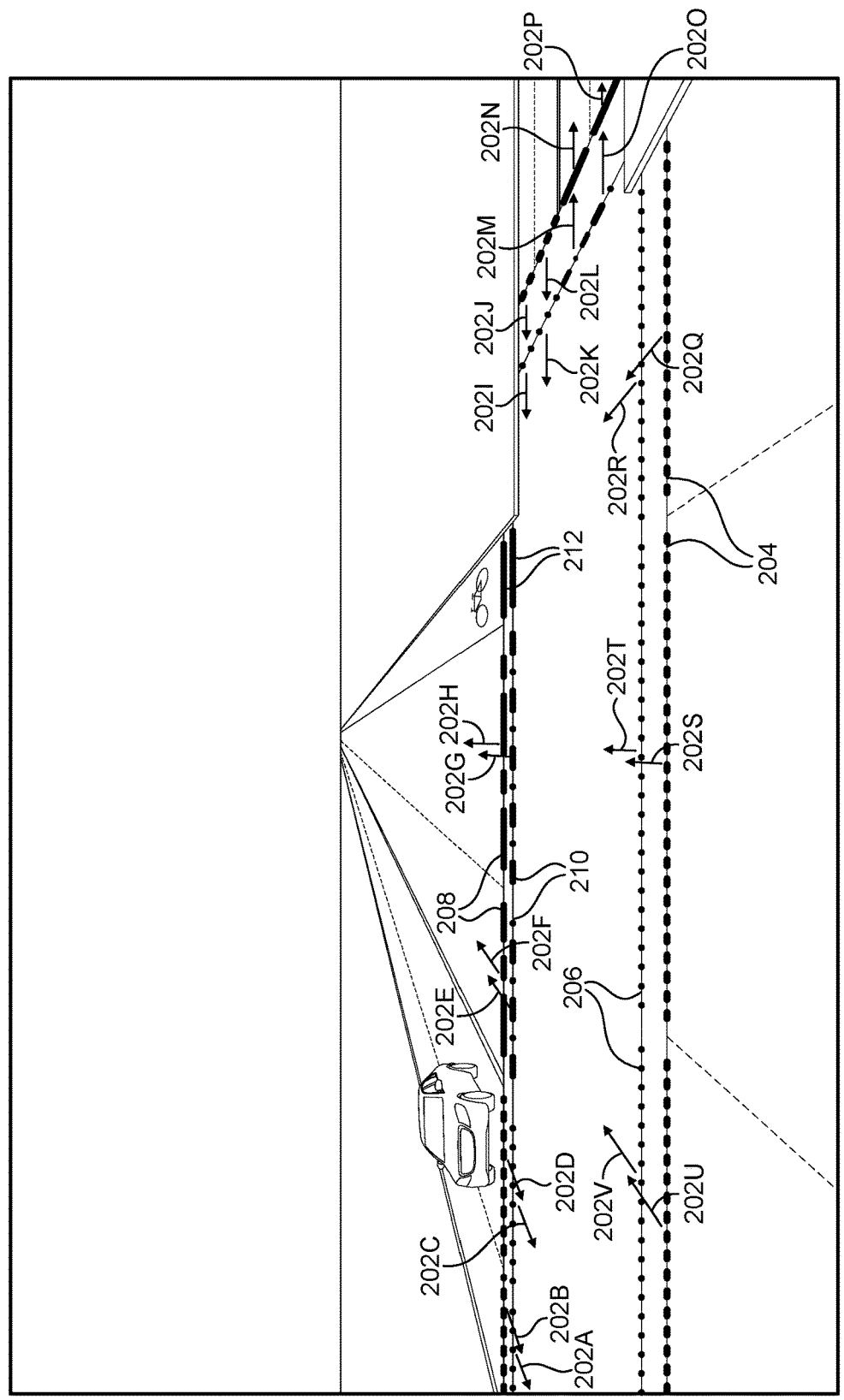
FIGS. 2A-2B are illustrations of example annotations for images for generating ground truth data for training a neural network to detect intersection structure and pose, in accordance with some embodiments of the present disclosure.
Figure 2B:
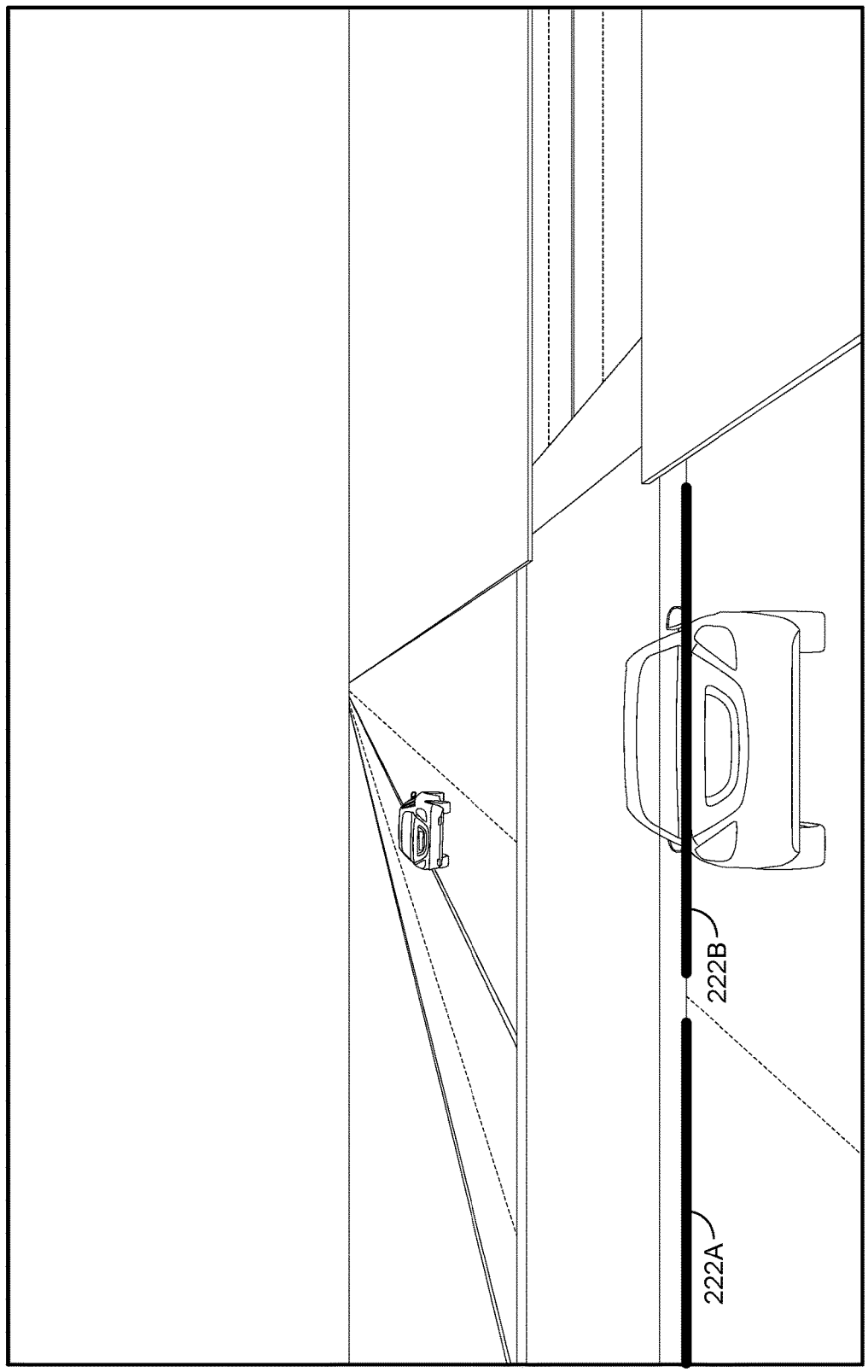

Now referring to FIGS. 2A-2B, FIGS. 2A-2B illustrate example annotations applied to sensor data for use in ground truth generation for training a machine learning model to detect intersection structure and pose, in accordance with some embodiments of the present disclosure. For example, FIG. 2A illustrates an example labeling (e.g., corresponding to the annotations 118) of an image 200A that may be used to generate ground truth data in accordance with the training process 100 of FIG. 1. Lanes in an image may be annotated with lane labels 118A (e.g., lanes 204, 206, 210, and 212) and corresponding classifications (e.g., pedestrian entry, intersection exit, intersection entry, pedestrian exit, no lane). For examples, lanes 204 may be labeled using line segments and classified as one or more of intersection entry and pedestrian entry. Similarly, lanes 206, lanes 208, and lanes 210 may be labeled using line segments, where lanes 206 may be classified as one or more of intersection entry and pedestrian exit, lanes 208 may be classified as one or more of intersection entry and pedestrian exit, and lanes 212 may be classified as no lane.

Further, labels for the lanes 204, 206, and 208 may further be annotated with a corresponding heading direction, as indicated by arrows 202A-202V. The heading direction may represent a direction of the traffic pertaining to a certain lane. In some examples, the heading directions may be associated with a center (or key) point of its corresponding lane label. For example, heading direction 202S may be associated with a center point of lane 204. The different classification labels may be represented in FIG. 2A by different line types—e.g., solid lines, dashed lines, etc.—to represent different classifications. However, this is not intended to be limiting, and any visualization of the lane labels and their classifications may include different shapes, patterns, fills, colors, symbols, and/or other identifiers to illustrate differences in classification labels for features (e.g., lanes) in the images.

Referring now to FIG. 2B, FIG. 2B illustrates another example of annotations applied to sensor data to train a machine learning model to detect intersection structure and pose, in accordance with some embodiments of the present invention. Here, lanes 222A and 222B in image 200B may be annotated with line segments. The line segment corresponding to the lane 222B may be annotated to extend over the vehicle. This may help train the machine learning model(s) 104 to predict the locations of key points even where the actual locations may be occluded. As a result, the presence of vehicles or other objects in the roadway may not detract from the ability of the system to generate proposed paths through intersections. The annotations may be of similar visual representation for a same classification. As illustrated, lanes 222A and 222B may be classified as intersection entry line stop line. In this way, similarly classified features of the image may be annotated in a similar manner. Further, it should be noted that classification(s) 118B may be compound nouns. The different classification labels may be represented in FIG. 2B by solid lines, dashed lines, etc. to represent different classifications. Further, the different classification labels may be nouns and/or compound nouns. This is not intended to be limiting, and any naming convention for classifications may be used to illustrate differences in classification labels for features (e.g., lanes) in the images.

Referring again to FIG. 1, the encoder 120 may be configured to encode the ground truth information corresponding to the intersection structure and pose using the annotation(s) 118. For example, as described herein, even though the annotations may be limited to lane labels 118A and classifications 118B, information such as key points, number of lanes, heading direction, directionality, width, and/or other structure and pose information may be determined from the annotations 118. Once this information is determined, the information may be encoded by the encoder 120 to generate the ground truth data 122. In addition, because the spatial resolution of the sensor data 102 being applied to the machine learning model(s) 104 may be different—e.g., greater than, less than, etc.—the output spatial resolution corresponding to predictions of the machine learning model(s) 104, the ground truth information may be encoded into various formats.

For example, the key points (e.g., center points, corner points, end points, etc.) may be encoded in the form of heat map(s) 124—such that each training image of the sensor data 102 has the same ground truth dimension (e.g., instead of creating some maximum number of key point predictions, and labeling non-existent points as null). In this way, images with different intersections including different number of associated key points may be encoded to include the same ground truth dimensions—e.g., by representing the key points in the form of a heat map 124. For a non-limiting example, each key point may be represented by a non-normalized Gaussian distribution with the mean parameter equal to the key point location. However, unlike a standard Gaussian heat map, in some embodiments, a directional and adaptive variance Gaussian heat map (e.g., a Gaussian heat map with adaptive directional radius) may be encoded to generate the heat map(s) 124. In such an example, the heat map(s) 124 may be generated with the variance set according to the ground truth lane width in image-space and the covariance computed from the ground truth line segment direction. For example, the heat map(s) may include an unnormalized normal distribution with a fixed standard deviation and/or an adaptive covariance. In some examples, the heat map(s) 124 may include multiple heat maps, with each heat map corresponding to different types of classification(s) 118B of key points determined from the annotations 118.

Figure 3A:
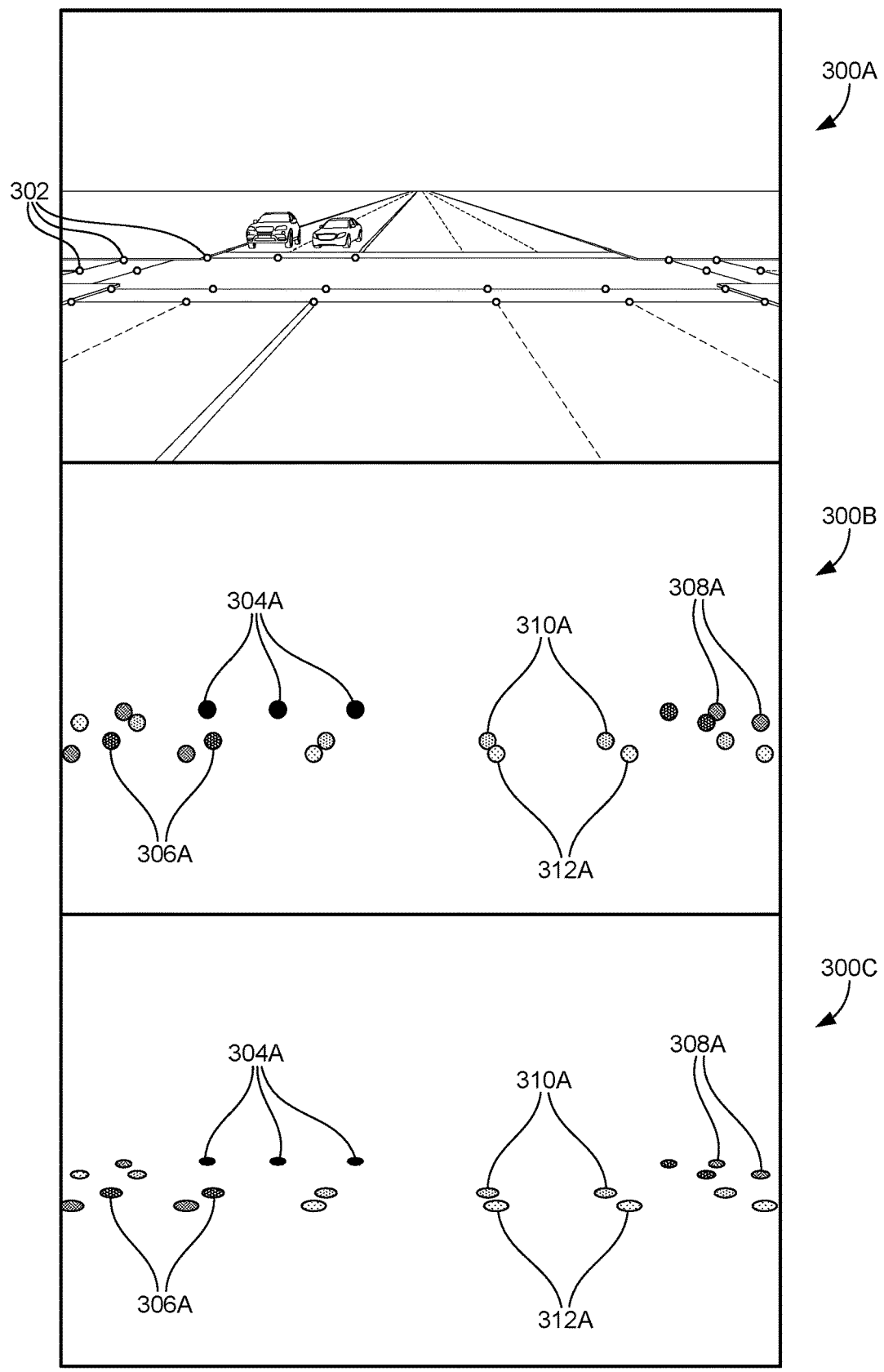
FIG. 3A is an illustration of example ground truth data generated for encoding key points from annotations, in accordance with some embodiments of the present disclosure.

As an example, with reference to FIG. 3A, FIG. 3A illustrates a directional and adaptive covariance heat map 300C generated using an annotated image 300A. The annotated image 300A includes key points 302. In some examples, key points 302 may include center points of image features (e.g., line segments corresponding to lanes). In some other examples, key points 302 may also include end points of the line segments. The directional and adaptive covariance heat map 300C and the standard Gaussian heat map are two non-limiting examples of heat maps 124 that may be used for encoding the key points corresponding to line segments. For example, standard Gaussian heat map 300B may encode key point locations using a fixed variance, and no correlation between 2D directions. The directional and adaptive variance heat map 300B may encode the key points, where the variance for each classification is set according to lane width in the image-space corresponding to the lane and the covariance is determined from the line direction of the corresponding lane (e.g., left and right direction pointing to end points). Each key point in the heat map may be encoded as represented by a non-normalized Gaussian distribution with a mean parameter equal to the key point location. As illustrated in FIG. 3A, each semantic class of key points 304A-312A is associated with a different pattern within the heat maps. For example, key points 304A in one semantic class have a different pattern than the key points 310A of another semantic class. In embodiments, different heat maps may be generated for each semantic class of key points, while in other embodiments a single heat map may represent each semantic class with some variance within the heat map corresponding to the particular semantic class.

In some embodiments, the left end key points and the right end key points corresponding to a left edge of a lane and a right edge of a lane, respectively, may be encoded in a vector field—e.g., a directional vector field 126A. For example, instead of, or in addition to, encoding the directionality of the line segment in the directional vector field 126A (as described herein), the directional vector field 126A may represent vectors to the left end key point, the center key point, and/or the right end key point. As such, the machine learning model(s) 104 may be trained to output the directional vector field 112A that may be decoded to determine the locations of the left end key point, the center key point (e.g., in addition to or in lieu of the heat maps 108), and/or the right end key point. In some examples, the direction vector field 126A may be encoded as decomposed vectors, where the vectors are decomposed into a unit-norm directional vector and magnitude (e.g., length).

Figure 3B:
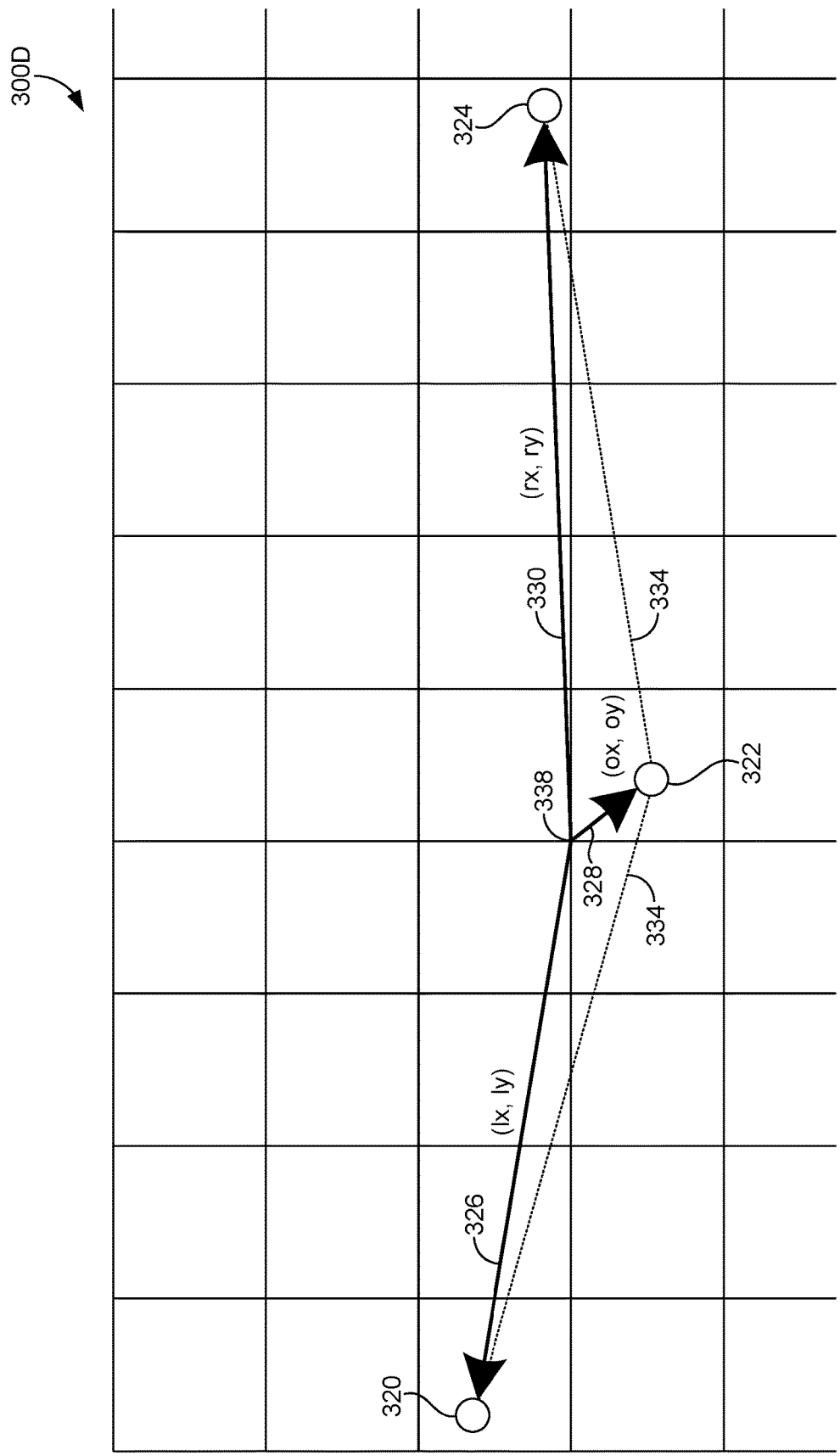
FIG. 3B is an illustration of an example calculation of offset vectors for generating ground truth data corresponding to key points, in accordance with some embodiments of the present disclosure.

As an example, and with respect to FIG. 3B, to encode the ground truth directional vector field 126A, a pixel (x, y) 338 at the output resolution (e.g., a sparse output, due to downsampling, for example) may be encoded to include a first vector 326 from the pixel 338 to a left end key point 320, a second vector 330 from the pixel 338 to a right end key point 324, and/or a third vector 328 from the pixel 338 to a center key point 322. The left end key point 320, the right end key point 324, and the center key point 322 may represent the location of these key points at the output resolution of the machine learning model(s) 104 as determined from their respective locations at the input resolution of the sensor data 102. For example, because the output resolution may be down-sampled with respect to the input resolution, there may not be a 1:1 pixel correspondence at the output resolution. As such, the vectors 326, 328, and 330 may encode the locations of the key points 320, 324, and 322 at the output resolution (and/or the ground truth resolution) such that the predictions of the machine learning model(s) 104 (e.g., the computed directional vector maps 112A) may be projected back to the input resolution. The key points 320, 322, and 324 may correspond to a polyline 334 annotated with respect to the ground truth sensor data at the input resolution.

In examples where the left end key points and the right end key points are encoded in the directional vector fields 126A, the heading direction and/or the width of the lanes may be directly determined from the reconstructed polyline. For example, the directional vector fields 112A may be decoded to determine the left end key points and the right end key points corresponding to line segments, and each line segment may be reconstructed by forming a line between the left end key point and the right end key point (and the center key point, in embodiments, as decoded from the heat maps 108). As such, the width of the lane that the line segment corresponds to may be determined from the length or magnitude of the reconstructed line segment (and/or from the distance between the left end key point and the right end key point). In addition, the heading angle corresponding to the lane may be determined using a normal to the direction of the line segment, and the heading direction may be determined using semantic or classification information (e.g., where the line segment corresponds to a crosswalk entry and the next line segment after the line segment corresponds to a crosswalk exit and intersection entry, the heading direction may be determined to be from the line segment towards the next line segment, heading into the intersection).

In some embodiments, the heading directions and/or directionality of the line segments may be encoded into directional vector fields 126, where the vectors correspond to the actual directionality of the line segment and/or heading of the lane. For example, instead of, or in addition to, encoding vectors to the left end key points, the center key points, and/or the right end key points, the vectors may represent an angle of the line segment and/or an angle of the heading. As such, the line segments may be decoded by determining the location of a center key point from a heat map 108, determining a width of the lane from an intensity map 114, and using the directionality decoded from the direction vector field 112A to generate a line segment extending from the center key point to the right and the left having a total length equal to the width of the lane. With respect to ground truth encoding, for example, once the directionality (e.g., the angle or other geometry of the lane) is determined from the annotations 118, a directional vector may be determined and attributed to the line segment—such as to the key point(s) (e.g., the center key point) representing the line segment. The direction vector field 126A may thus represent the directional vector and/or a number of additional directional vectors attributed to surrounding pixels or points within a radius of the key point(s). For example, and with respect to FIG. 3C, the directional vector may be applied to a pixel(s) 340 that corresponds to the key point(s) (or a closest corresponding pixel 340 where the output resolution of the machine learning model(s) 104 is different from the input resolution of the sensor data 102 and/or the ground truth data), and the same directional vector may also be applied to the pixel(s) within a predetermined radius 342 of the key point(s) pixel. Each of these directional vectors for each of the key point pixels may then be encoded to generate the direction vector field 126A.

Similarly, once the heading is determined (e.g., from the directionality—as the normal thereto—or otherwise), a heading vector may be determined and attributed to the line segment—such as to the key point(s) representing the line segment. For example, once the heading (e.g., the angle corresponding to the direction of travel of vehicles along the lane) is determined, a heading vector may be determined and attributed to the line segment—such as to the key point(s) representing the line segment. The heading vector field 126B may thus represent the heading vector and/or a number of additional heading vectors attributed to surrounding pixels or points within a radius of the key point(s). For example, and with respect to FIG. 3C, the heading vector may be applied to a pixel(s) 340 that corresponds to the key point(s) (or a closest corresponding pixel 340 where the output resolution of the machine learning model(s) 104 is different from the input resolution of the sensor data 102 and/or the ground truth data), and the same heading vector may also be applied to the pixel(s) within a predetermined radius 342 of the key point(s) pixel. Each of these heading vectors for each of the key point pixels may then be encoded to generate the heading vector field 126A.

In some non-limiting embodiments, offset vectors may be determined and encoded to generate the offset vector field 126C. The offset 126 vector fields may be encoded by assigning, for each pixel in an offset vector field, a vector pointing to the closest ground truth key point pixel location. In this way, smaller encoding channels may be used even when the 2D encoding channels have a different spatial resolution than the input image (e.g., a down-sampled image). This allows the machine learning model(s) 104 to train and predict intersection structure and pose in a computationally less expensive manner because the smaller encoding channels may be used without losing information due to down-sampling of images during processing by the machine learning model(s) 104. In some examples, ground truth data 122 for a number of features (e.g., lanes) per classification(s) 118B may be encoded directly using a simple count. The machine learning model(s) 104 may then be trained to predict the number of features per classification(s) 118B directly.

In some embodiments, the intensity map(s) 128 may be implemented to encode lane widths—as determined from the lane label(s) 118A corresponding to segments of the lane(s). For example, once the lane widths are determined, the lane width for the lane segment corresponding to each key point may be encoded by assigning an intensity value equal to the lane width (e.g., in image-space) normalized by image width (e.g., also in image-space) to the key point. In some examples, the same intensity value may be assigned to other pixels within a defined radius of the associated key point, similar to as described herein with respect to the direction vector fields 126A and the heading vector fields 126B.

Once the ground truth data 122 is generated for each instance of the sensor data 102 (e.g., for each image where the sensor data 102 includes image data), the machine learning model(s) 104 may be trained using the ground truth data 122. For example, the machine learning model(s) 104 may generate output(s) 106, and the output(s) 106 may be compared—using the loss function(s) 130—to the ground truth data corresponding to the respective instance of the sensor data 102. As such, feedback from the loss function(s) 130 may be used to update parameters (e.g., weights and biases) of the machine learning model(s) 104 in view of the ground truth data 122 until the machine learning model(s) 104 converges to an acceptable or desirable accuracy. Using the process 100, the machine learning model(s) 104 may be trained to accurately predict the output(s) 106 (and/or associated classifications) from the sensor data 102 using the loss function(s) 130 and the ground truth data 122. In some examples, different loss functions 130 may be used to train the machine learning model(s) 104 to predict different outputs 106. For example, a first loss function 130 may be used for comparing the heat map(s) 108 and 124 and a second loss function 130 may be used for comparing the intensity maps 128 and the intensity maps 114. As such, in non-limiting embodiments, one or more of the output channels be trained using a different loss function 130 than another of the output channels.

The machine learning model(s) 104 may use the sensor data 102 to compute the output(s) 106, which may ultimately be applied to a decoder or one or more other post-processing components (described in more detail herein at least with respect to FIG. 5) to generate key points, classifications, lane widths, a number of lanes, lane heading, lane directionality, and/or other information. Although examples are described herein with respect to using deep neural networks (DNNs), and specifically convolutional neural networks (CNNs), as the machine learning model(s) 104 (e.g., with respect to FIGS. 1 and 5), this is not intended to be limiting. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of machine learning models.

As an example, such as where the machine learning model(s) 104 include a CNN, the machine learning model(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 104, and some or all of the convolutional streams may include a respective fully connected layer(s).

In some non-limiting embodiments, the machine learning model(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 104, this is not intended to be limiting. For example, additional or alternative layers may be used in the machine learning model(s) 104, such as normalization layers, SoftMax layers, and/or other layer types.

In embodiments where the machine learning model(s) 104 includes a CNN, different orders and numbers of the layers of the CNN may be used depending on the embodiment. In other words, the order and number of layers of the machine learning model(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 4:
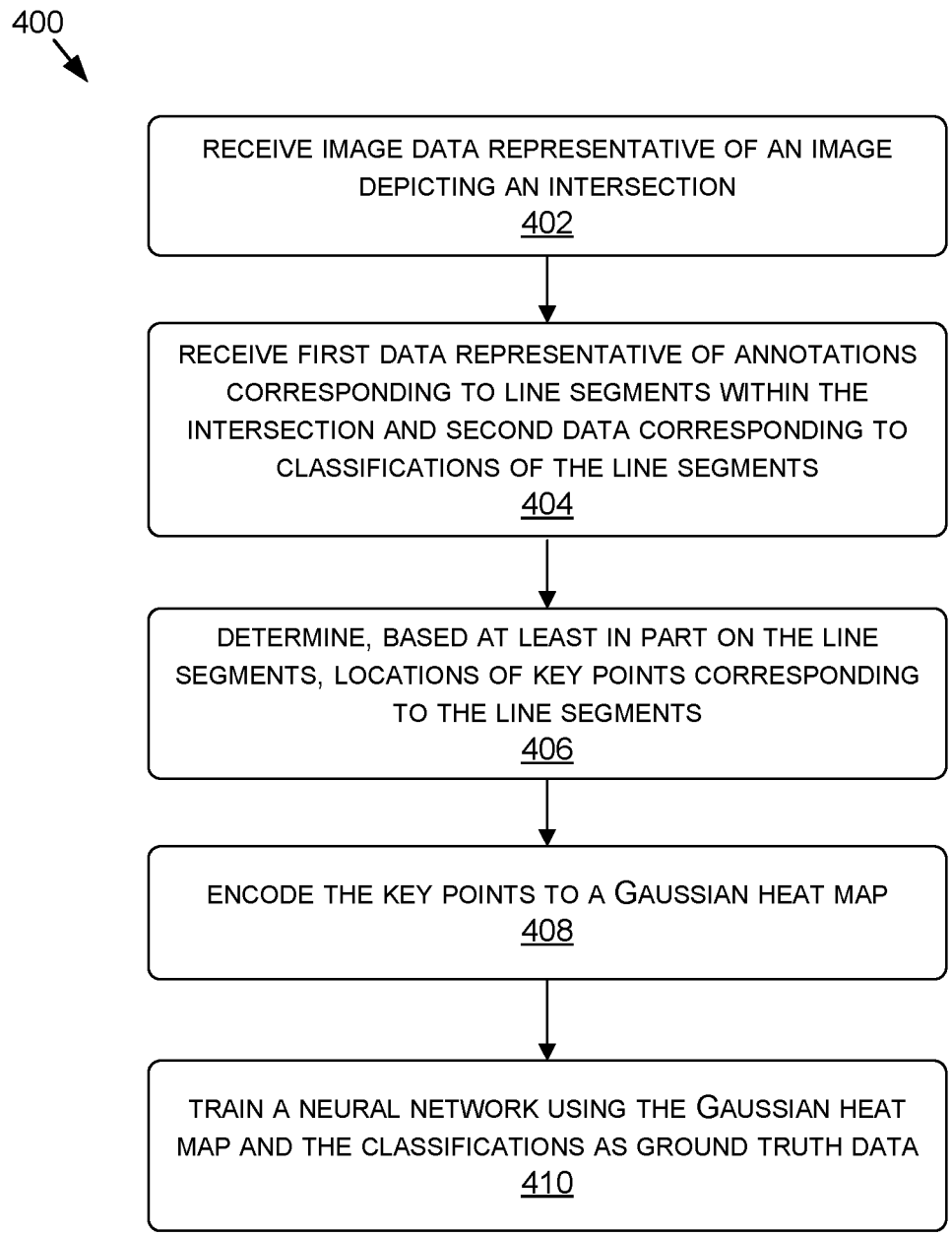
FIG. 4 is a flow diagram illustrating an example method for training a neural network to detect intersection structure, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1. However, this method may additionally or alternatively be executed by any one system, or any combination of systems, including, but not limited to, those described herein.

FIG. 4 is a flow diagram showing a method 400 for training a neural network to detect intersection structure and pose, in accordance with some embodiments of the present disclosure. The method 400, at block B402, includes receiving image data representative of an image depicting an intersection. For example, the sensor data 102 may be received, where the sensor data 102 includes image data representing an image depicting an intersection.

The method 400, at block B404, includes receiving first data representative of annotations corresponding to line segments within the intersection, and second data corresponding to classification of the line segments. For examples, data representative of the annotations 118 may be generate and/or received, where the annotations include lane label(s) 118A corresponding to line segments within the intersection and classification(s) 118B for the line segments.

The method 400, at block B406, includes determining, based at least in part on the line segments, locations of key points corresponding to the line segments. For examples, lane label(s) 118A may include key points corresponding to a center point, a left end point, and/or a right end point for each line segment.

The method 400, at block B408, includes encoding the key points to a Gaussian heat map. For example, encoder 120 may encode the key points to the heat map(s) 124 to use as ground truth data 122 to train the machine learning model(s) 104.

The method 400, at block B410, includes training a neural network using the Gaussian heat map and the classifications as ground truth data. For example, the heat maps(s) 124 may be used as ground truth data 122 along with the classification(s) 118B to train the machine learning model(s) 104 to detect intersection structure and pose.

Figure 5:
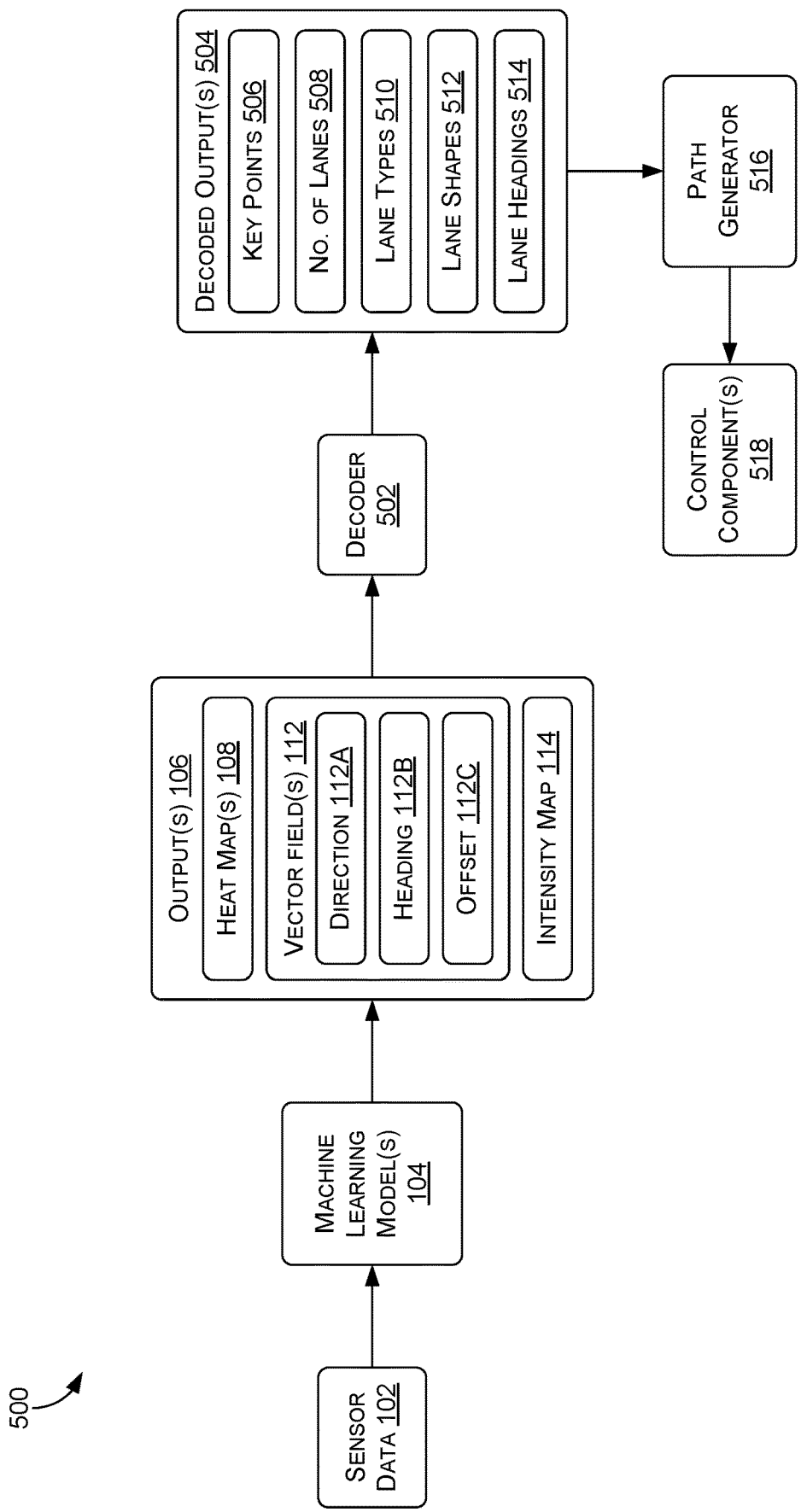
FIG. 5 is a data flow diagram illustrating an example process for detecting and generating paths to navigate intersections using outputs from sensors of a vehicle in real-time or near real-time, in accordance with some embodiments of the present disclosure.

Referring now to FIG. 5, FIG. 5 is a data flow diagram illustrating an example process 500 for generating paths to navigate intersections using outputs from sensors of a vehicle in real-time or near real-time, in accordance with some embodiments of the present disclosure. While the intersection feature types primarily described with respect to FIG. 5 are lanes and crosswalks, this is not intended to be limiting, and is used for example purposes only.

The sensor data 102 may be similar to that described herein at least with respect to FIG. 1. During deployment, the sensor data 102 may be applied to the machine learning model(s) 104 that has been trained according to the process 100, for example, to compute heat maps 108 (and corresponding classifications), vector fields 112, and/or intensity maps 114 using training sensor data 102. As such, the machine learning model(s) 104 may output—or regress on—one or more of the heat map(s) 108, the vector field(s) 112, and the intensity map(s) 114, as described in more detail at least with respect to the output(s) 106 in FIG. 1.

The output(s) 106 may be applied to a decoder 502 to generate decoded output(s) 504. In some examples, the decoder 502 may use one or more post-processing algorithms (e.g., temporal smoothing, curve fitting, filtering, etc.) to compute the decoded output(s) 504. For example, the decoder 502 may use the outputs 106 to generate a representation of the intersection and/or pose, which may be used, in turn, to generate one or more paths through the intersection—e.g., by path generator 516. The decoded outputs 504 may include key points 506, a number of lanes 508, lane types 510, lane shapes 512, lane headings 514, and/or other information corresponding to the intersection (e.g., line segments corresponding to the intersection which may be used to generate visualizations of the intersection for debugging, etc.).

In some embodiments, one or more of the outputs may be generated at a first spatial resolution (e.g., a down-sampled spatial resolution) that is different from a second spatial resolution corresponding to the sensor data 102. As such, the decoder 502 may decode the data from the first spatial resolution of the outputs 106 and project or attribute the data to the second spatial resolution of the sensor data 102 (e.g., using the offset vector fields 112C, as described herein). As a result, the processing speeds of the machine learning model(s) 104 may be increased while simultaneously preserving compute resources for other tasks of the system. In addition, by increasing processing speeds, the run-time of the system may be decreased thereby enabling real-time or near real-time deployment of the process 500 within the system (e.g., the vehicle 800).

The heat map(s) 108 may be used by the decoder to determine locations of the center key points, left key points, and/or right key points corresponding to a center of a lane, a left edge of a lane, or a right edge of a lane, respectively. For example, as described herein, the key points in the output(s) 106 may be represented by spatially distributed probability distributions within the heat map(s) 108, the decoder 501 may determine the 2D coordinates that represent a location of the key points (e.g., at the input spatial resolution and/or the output spatial resolution). In some embodiments, because the heat map(s) 108 may include more than one key point in a given region, the decoder 502 may apply a peak finding algorithm to determine center localization of key points 506 as points with the highest probability within a predetermined sized sliding window. For example, the decoder 502 may execute a local search within the predetermined sized sliding window, and a pixel may be selected as a key point of key points 506 if its probability within the windrow is the highest. The peak finding algorithm may cause a center point pixel to be discarded if it is not a peak probability pixel within that window. The size of the sliding window may be predetermined based on a hyper parameter optimization performed prior to training the machine learning model(s) 104. The decoded output(s) 504 may then include a pixel location corresponding to a probability distribution peak, achieved through non-maximum suppression, as a key point in key points 506. In some embodiments, the 2D locations of the surviving peak probability center key points are output by the decoder 502 as key points 506. In non-limiting examples, the key points 506 may be filtered to remove overlap using non-maximum suppression or another filtering algorithm. In some examples, a degree of overlap between two points may be determined by calculating a distance between two points normalized by their lengths.

The 2D locations (e.g., 2D image-space coordinates) of the key points 506 may then be used to determine three-dimensional (3D) world-space coordinates, in order to aid the vehicle 800 in navigating through the world-space environment. Any known method of projecting 2D locations into 3D space may be used. In some examples, a flat model assumption may be used to project the locations into 3D space. In some other examples, LIDAR data for depth and/or distance estimation may be leveraged for the projection, and/or future motion of the vehicle 800 as the vehicle 800 traverses the road surface may be used (e.g., to generate more accurate ground truth for training the network), such as to determine a slope or profile of the driving surface to more accurately project the 2D points into 3D space. In some embodiments, the machine learning model(s) 104 may be trained on 3D data to directly predict key point locations in 3D world-space.

In some embodiments, the lane types 510 (e.g., intersection entry, intersection exit, crosswalk entry, crosswalk exit, stop line, ego-lane, right adjacent lane, left adjacent lane, bike path, non-drivable lane, drivable lane, a combination thereof, or the like) may be computed by the decoder 502 using the heat map(s) 108. The lane types 510 for corresponding key points 506 may correspond the label classifications for line segments (described in more detail herein with respect to FIGS. 1 and 2A-2B) as detected by the machine learning model(s) 104. For example, in some non-limiting embodiments, each classification or lane label may correspond to a separate heat map(s) 108. As such, the lane types 510 may be directly determined from the lane type 510 associated with the respective heat map. In other examples, the lane types 510 may be encoded in the heat maps 108 using a different technique, such as those described herein with respect to FIG. 1. In some examples, the machine learning model(s) 104 may be trained to compute confidences corresponding to lane types 510 and/or other semantic information—e.g., using any suitable method for classification.

The number of lanes 508 and/or number of lanes of a particular lane type 510 may be computed by the decoder 502 by counting the number of key points 506 (e.g., the number of center key points) detected, and/or by counting the number of key points (e.g., center key points) that correspond to a particular lane type 510.

The decoder 502 may further generate the lane shapes 512 using the direction vector fields 112A and/or the intensity map 114. For example, as described herein, the direction vector fields 112A may correspond to vectors from pixels at the output resolution to the locations of the left edge key points, center key points, and/or right edge key points—as described in more detail herein with respect to FIG. 3B. In such examples, the direction vector fields 112A may be decoded by the decoder 502 to generate the lane shapes 512 (e.g., in addition to using the locations of the key points 506 from the head maps 108, and/or other information from the outputs 106 and/or the decoded outputs 108). The left and right end points for each line segment may be determined based on the vector field(s) 112 corresponding to the associated key points 506, and this information may be used to determine a direction or angle along the lateral dimension of lane, a lane heading 514 (e.g., taking the normal to the direction of the lateral dimension of the lane), and/or a width of the lane (e.g., the width may be the distance along the line segment, or a distance between the left edge key point and the right edge key point for a given line segment). As such, the width and/or the lateral direction (e.g., the normal to the direction of travel along the lane) may be used to determine the shape of the lane 512 at least with respect to the portion of the lane corresponding to the line segment and/or the left edge key point and the right edge key point.

In other examples, the lane shapes 512 may be determined by decoding the intensity maps 114 to determine the width of the lanes and/or decoding the direction vector fields 112A to determine a directionality of a line segment corresponding to a center key point (e.g., as described with respect to FIG. 3C). As such, the location of the center key point, the directionality, and the width may be leveraged to determine the lane shapes 512 (e.g., by extending the line segment from the center key point according to the directionality and up to a width of the line segment—such as half the width from the center key point along the directionality in one direction, and then half the width from the center key point along the directionality in the opposite direction).

The decoder 502 may further determine the lane headings 514. For example, the lane headings 514 may be determined as the normal to a line segment generated between the known locations of the left edge key point and the right edge key point. In other examples, the lane headings 514 may be determined by decoding the heading vector fields 112B to determine the angle corresponding to the heading direction of the lane. In some examples, the lane headings 514 may leverage the lane types 510 and/or other semantic information output by the network, as described herein.

The decoded output(s) 504 may be used by a path generator 516 to generate paths for navigating the intersection. The path generator 516 may connect the (center) key points 506 according to their 3D real-world coordinates to generate polylines that represent potential paths for traversing the intersection by the vehicle 800 in real-time or near real-time. The final paths may be assigned path types determined relative to the position of the vehicle, the location of the key points 506, and/or the lane headings 514 (e.g., angles). Potential path types may include, without limitation, left turn, right turn, switch lanes, and/or continue in lane.

In some examples, the path generator 516 may implement curve fitting in order to determine final shapes that most accurately reflect a natural curve of the potential paths. Any known curve fitting algorithms may be used, such as but not limited to, polyline fitting, polynomial fitting, and/or clothoid fitting. The shape of the potential paths may be determined based on the locations of the key points 506 and the corresponding heading vectors (e.g., angles) (e.g., lane headings 514) associated with the key points 506 to be connected. In some examples, the shape of a potential path may be aligned with a tangent of the heading vector at the location of the key points 506 to be connected. The curve fitting process may be repeated for all key points 506 that may potentially be connected to each other to generate all possible paths the vehicle 800 may take to navigate the intersection. In some examples, non-feasible paths may be removed from consideration based on traffic rules and physical restrictions associated with such paths. The remaining potential paths may be determined to be feasible 3D paths or trajectories that the vehicle 800 may take to traverse the intersection.

In some embodiments, the path generator 516 may use a matching algorithm to connect the key points 506 and generate the potential paths for the vehicle 800 to navigate the intersection. In such examples, matching scores may be determined for each pair of key points 506 based on the location of the key points 506, lane headings 514 corresponding to the key points 506 (e.g., two key points 506 corresponding to different directions of travel will not be connected), and the shape of the fitted curve between the pair of key points 506. Each key point 506 corresponding to an intersection entry may be connected to multiple key points 506 corresponding to an intersection exit—thereby generating a plurality of potential paths for the vehicle 800. In some examples, a linear matching algorithm such as Hungarian matching algorithm may be used.

In other examples, a non-linear matching algorithm such as spectral matching algorithm may be used to connect a pair of key points 506.

The paths through the intersection may be used to perform one or more operations by a control component(s) 518 of the vehicle 800. In some examples, a lane graph may be augmented with the information related to the paths. The lane graph may be input to one or more control component(s) 518 to perform various planning and control tasks. For example, a world model manager may update the world model for aid in navigating the intersection, a path planning layer of an autonomous driving software stack may use the intersection information to determine the path through the intersection (e.g., along one of the determined potential paths), and/or a control component may determine controls of the vehicle for navigating the intersection according to a determined path.

Figure 6A:
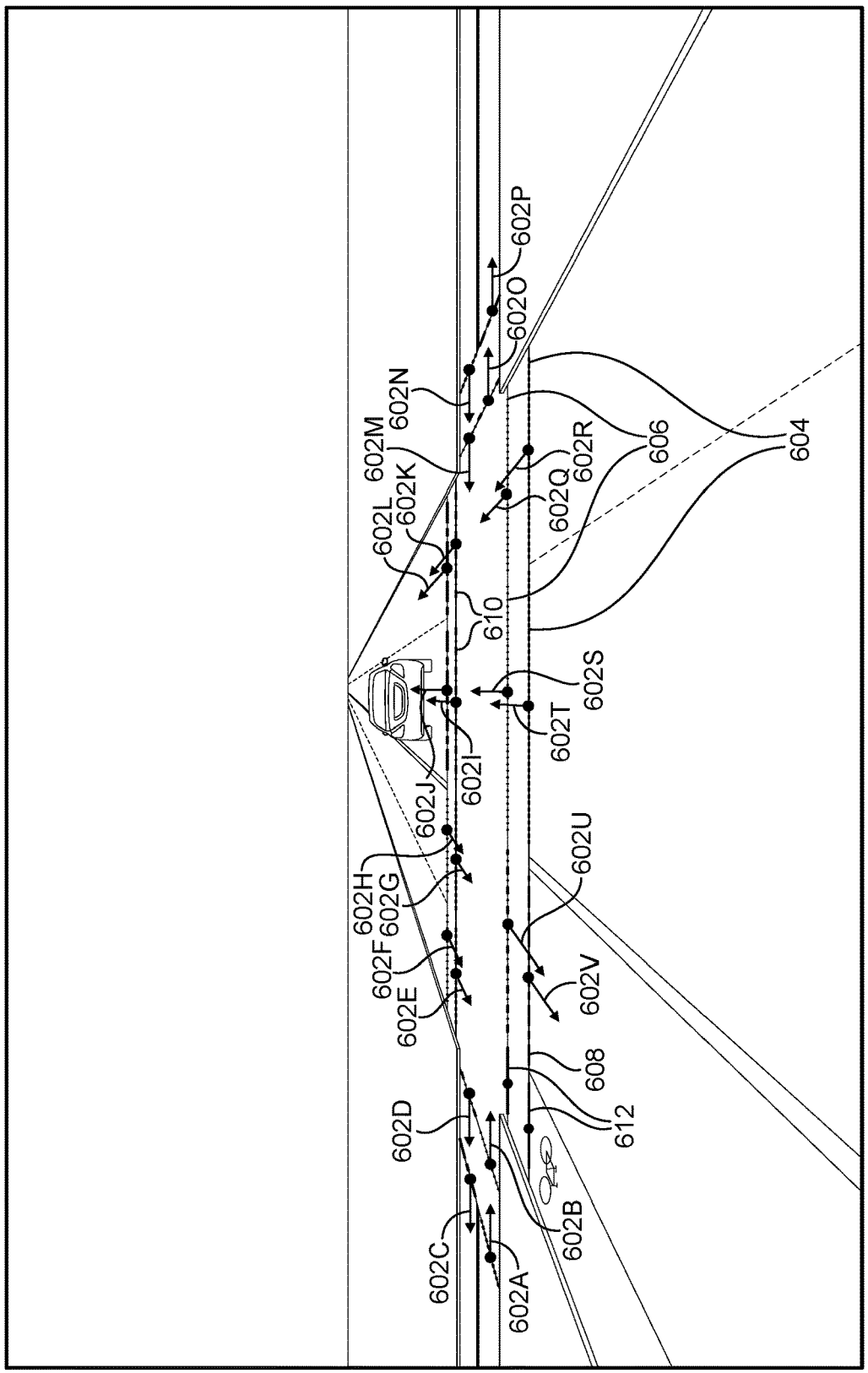
FIG. 6A is a visualization of an example intersection structure and pose generated using a neural network, in accordance with some embodiments of the present disclosure.

Now referring to FIG. 6A, FIG. 6A illustrates an example intersection structure prediction 600A (e.g., output(s) 106 of FIG. 5) generated using a neural network (e.g., machine learning model(s) 104 of FIG. 5), in accordance with some embodiments of the present disclosure. The prediction 600A includes a visualization of predicted line segments corresponding to lane classifications 604, 606, 608, 610, and 612, for each lane detected in the sensor data (e.g., sensor data 102 of FIG. 5). For example, the lane classification 604 may correspond to an entrance to a pedestrian crossing lane type, the lane classification 606 may correspond to an entrance to an intersection and/or an exit from a pedestrian crossing lane type, the lane classification 608 may correspond to an exit from a pedestrian crossing lane type, the lane classification 610 may correspond to an exit from an intersection and/or an entrance to a pedestrian crossing lane type, and the lane classifications 612 may correspond to a non-drivable lane type. Each line segment may also be associated with a center key point 506 and/or a corresponding heading direction(s) (e.g., key points and associated vectors 602A-602V). As such, the intersection structure and pose may be represented by a set of line segments with corresponding line classifications, key points, and/or heading directions.

Figure 6B:
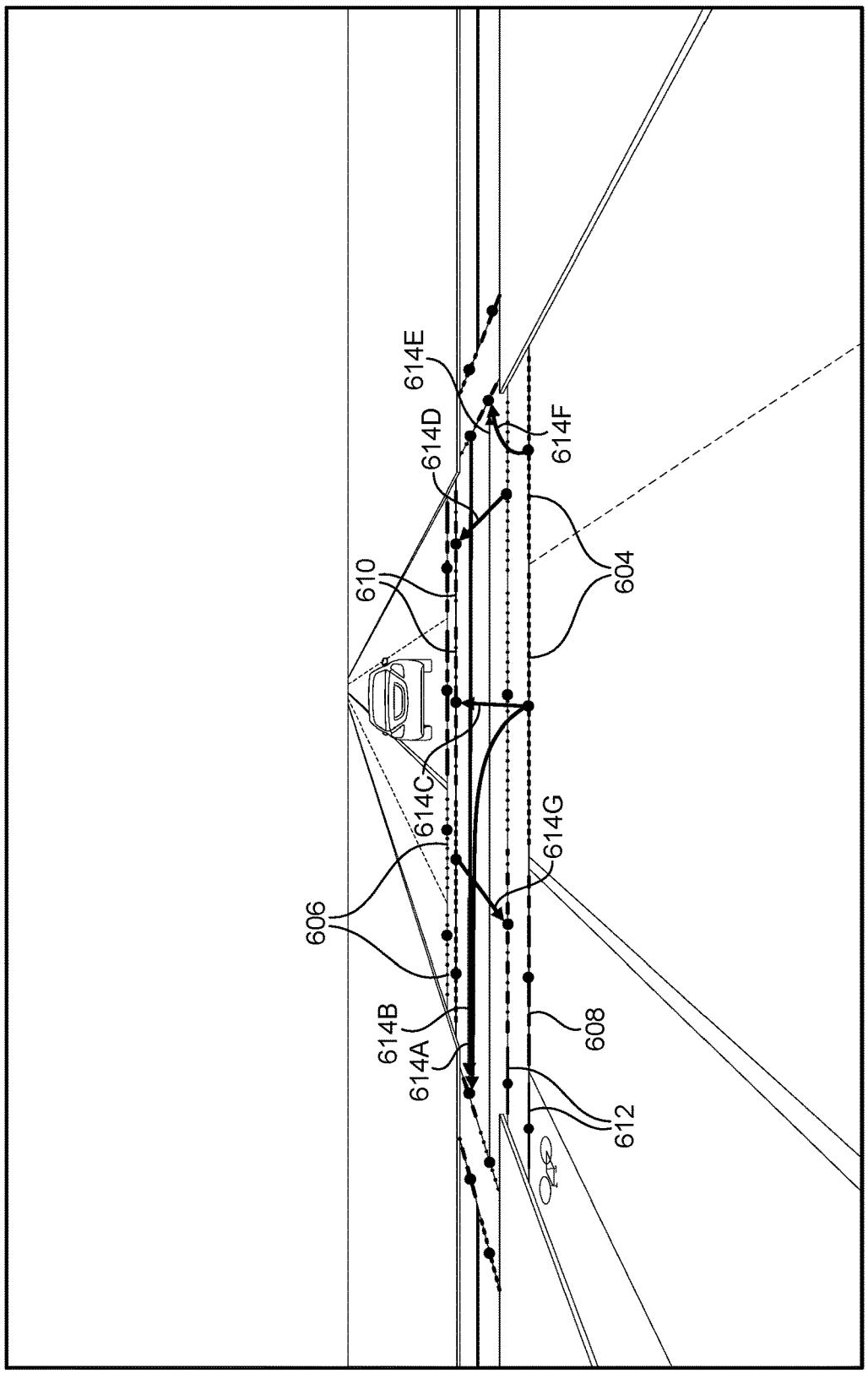
FIG. 6B is an illustration of example paths generated by a path generator based on an intersection structure and pose as computed using a neural network, in accordance with some embodiments of the present disclosure.

Referring to FIG. 6B, FIG. 6B illustrates example paths 600B generated by a path generator (e.g., path generator 516 of FIG. 5) based on the intersection structure 600A predicted by a neural network (e.g., machine learning model(s) 104 of FIG. 5). Paths 614A-614G are potential paths generated by connecting key points 602A-602V predicted by the neural network in FIG. 6A. The paths 614A-614G may correspond to paths for the ego-vehicle 800 and/or other vehicles or objects. The paths for other vehicles or objects may be informative to the vehicle 800 to help in determining potential future locations of other vehicles or objects as they traverse the intersection.

Figure 7:
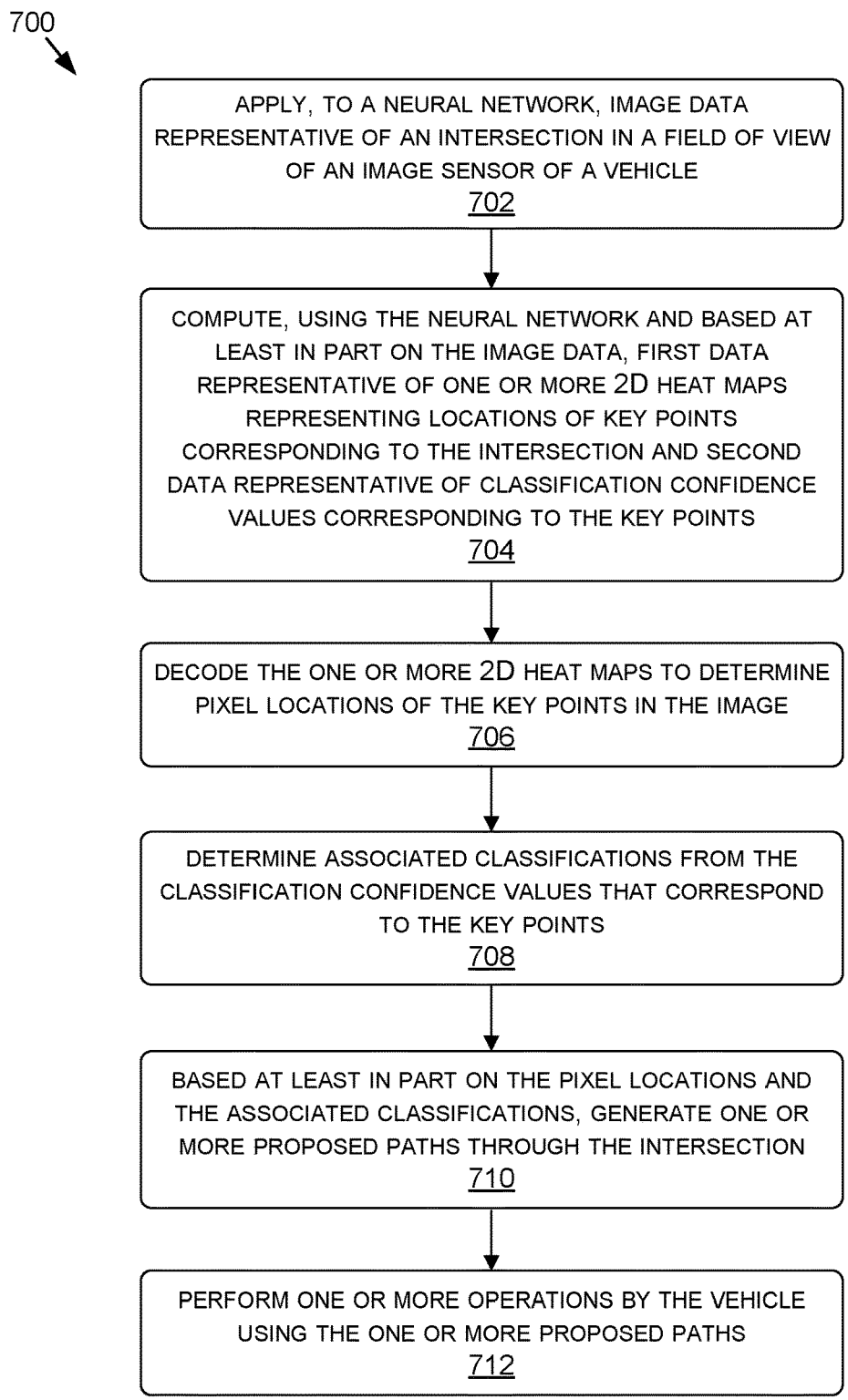
FIG. 7 is a flow diagram illustrating an example method for computing an intersection structure and pose as well as a path there through, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 500 of FIG. 5. However, this method may additionally or alternatively be executed by any one system, or any combination of systems, including, but not limited to, those described herein.

FIG. 7 is a flow diagram showing a method 700 for detecting and navigating an intersection, in accordance with some embodiments of the present disclosure. The method 700, at block B702, includes applying, to a neural network, image data representative of an intersection in a field of view of an image sensor of a vehicle. For example, the sensor data 102 representing an image of an intersection in a field of view of an image sensor of vehicle 800 may be applied to the machine learning model(s) 104.

The method 700, at block B704, includes computing, using the neural network and based at least in part on the image data, first data representative of one or more two-dimensional (2D) heat maps representing locations of key points corresponding to the intersection and second data representative of classification confidence values corresponding to the key points. For example, the machine learning model(s) 104 may compute output(s) 106 with heat map(s) 108 including key points corresponding to the intersection and confidence values corresponding to line segment classification.

The method 700, at block B706, includes decoding the one or more 2D heat maps to determine pixel locations of the key points in the image. For example, the decoder 502 may decode the heat map(s) 108 to determine pixel locations of key points 506 in the image.

The method 700, at block B708, includes determining associated classifications from the classification confidence values that correspond to the key points. For example, the decoder 502 may determine, based on the confidence values, associated lane types 510 from the line segment classification that correspond to key points 506.

The method 700, at block B710, includes, based at least in part on the pixel locations and the associated classifications, generating one or more proposed paths through the intersection. For example, the path generator 516 may generate potential or proposed paths through the intersection based on the pixel locations of the key points 506 and the lane type 510.

The method 700, at block B712, includes performing one or more operations by the vehicle using the one or more proposed paths. For example, the control component(s) 518 may cause the vehicle 800 to perform one or more operations based on the proposed paths received from the path generator 516.

Example Autonomous Vehicle

Figure 8A:
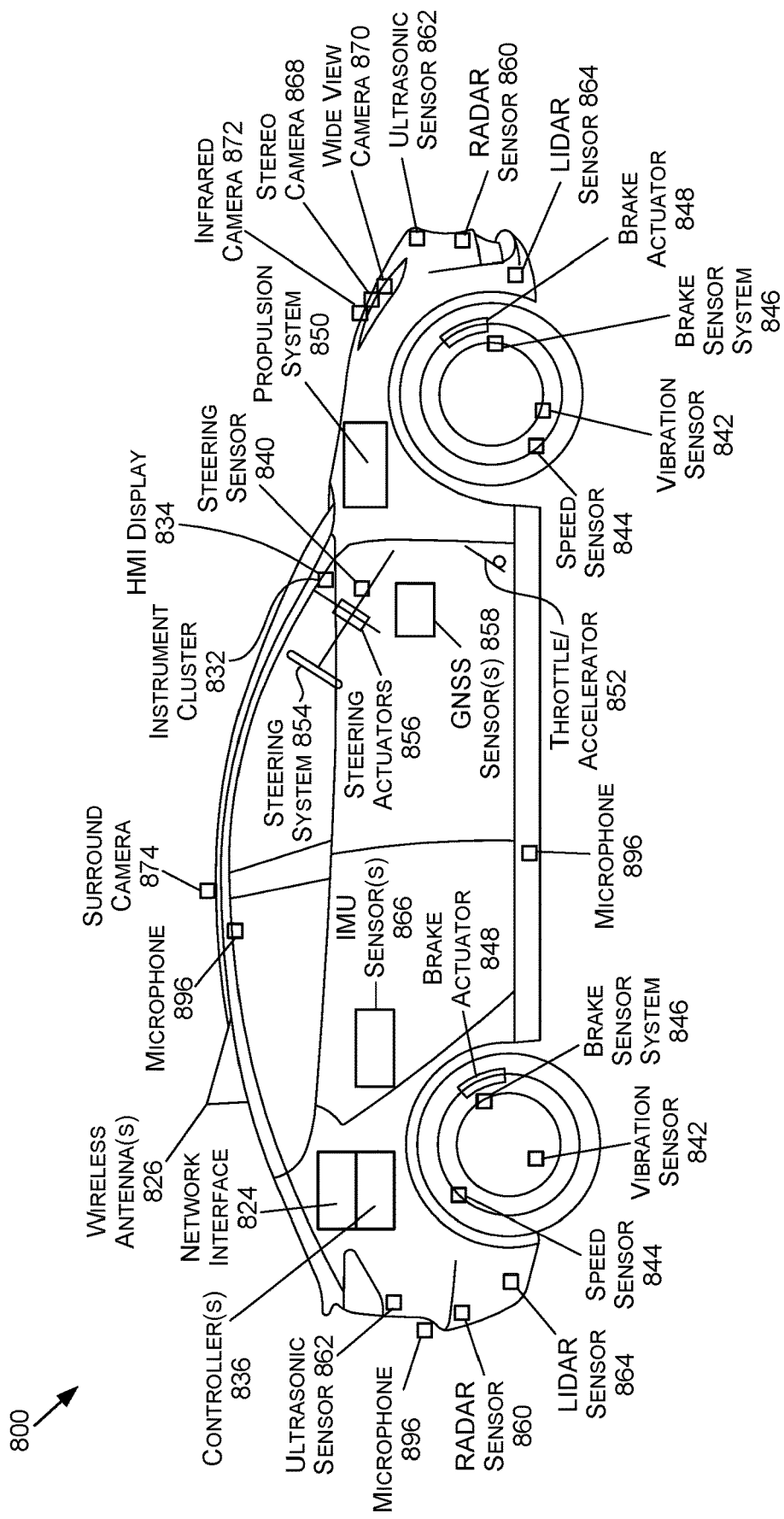
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3—Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as BLUETOOTH, BLUETOOTH LE, Z-WAVE, ZIGBEE etc., and/or low power wide-area network(s) (LPWANs), such as LORAWAN, SIGFOX, etc.

Figure 8B:
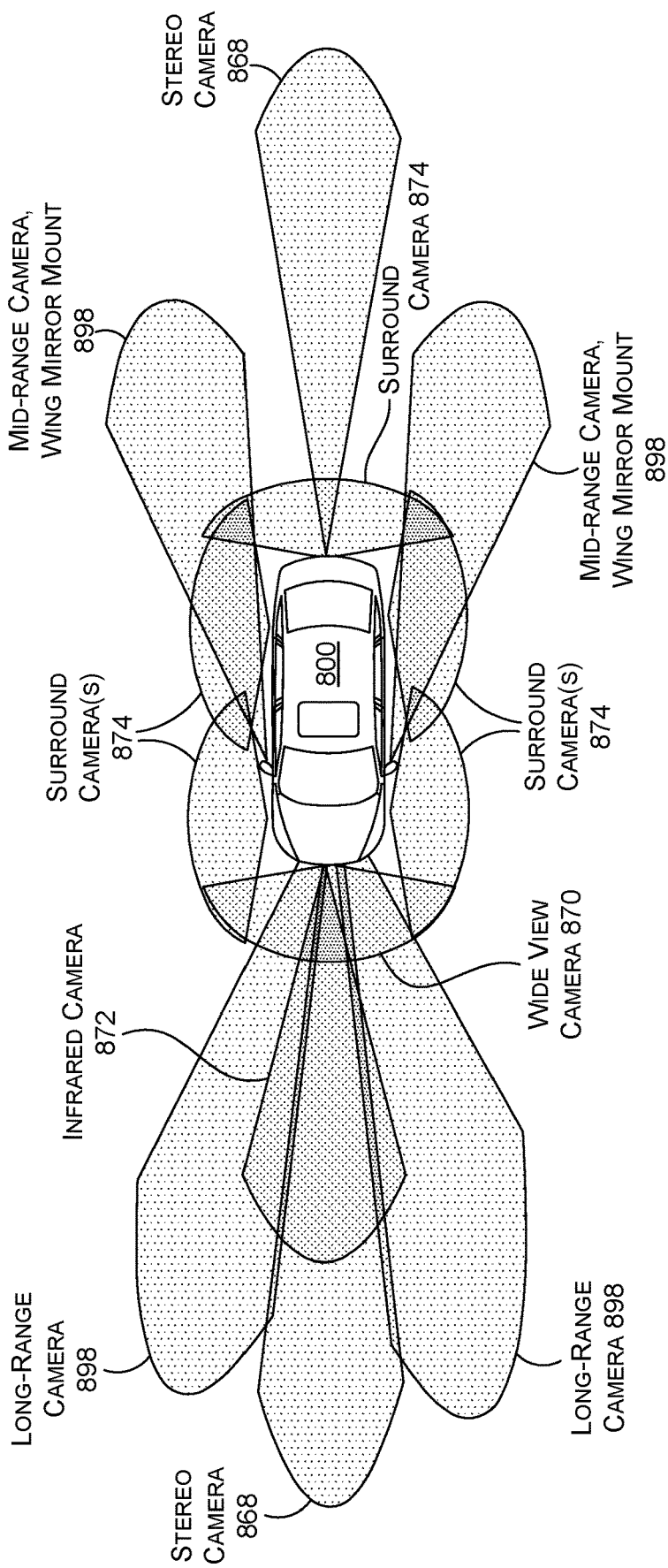
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image.

An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
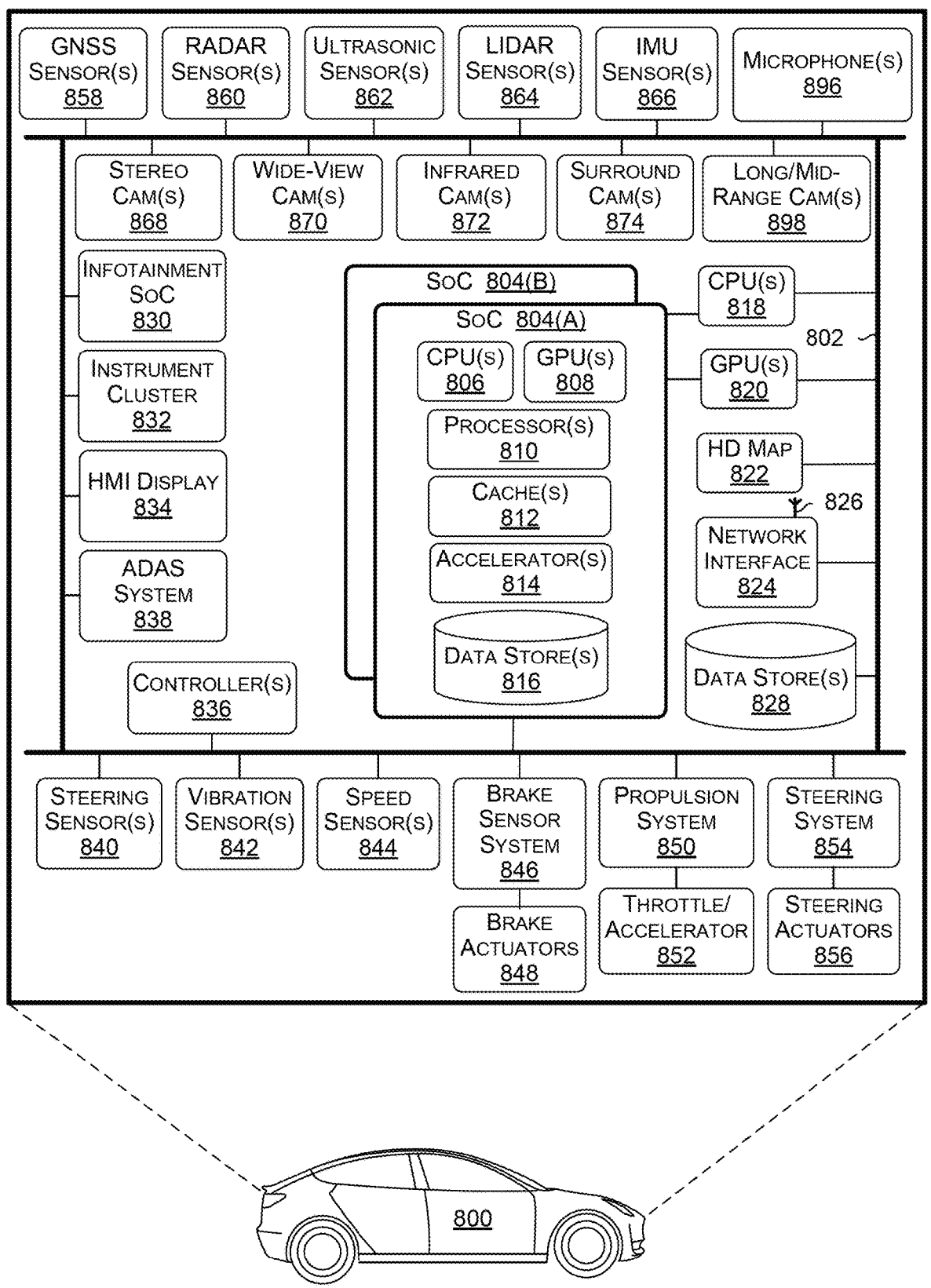
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a BLUETOOTH antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, BLUETOOTH, BLUETOOTH LE, WI-FI, Z-WAVE, ZIGBEE, LORAWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 820-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WI-FI, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, WI-FI steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
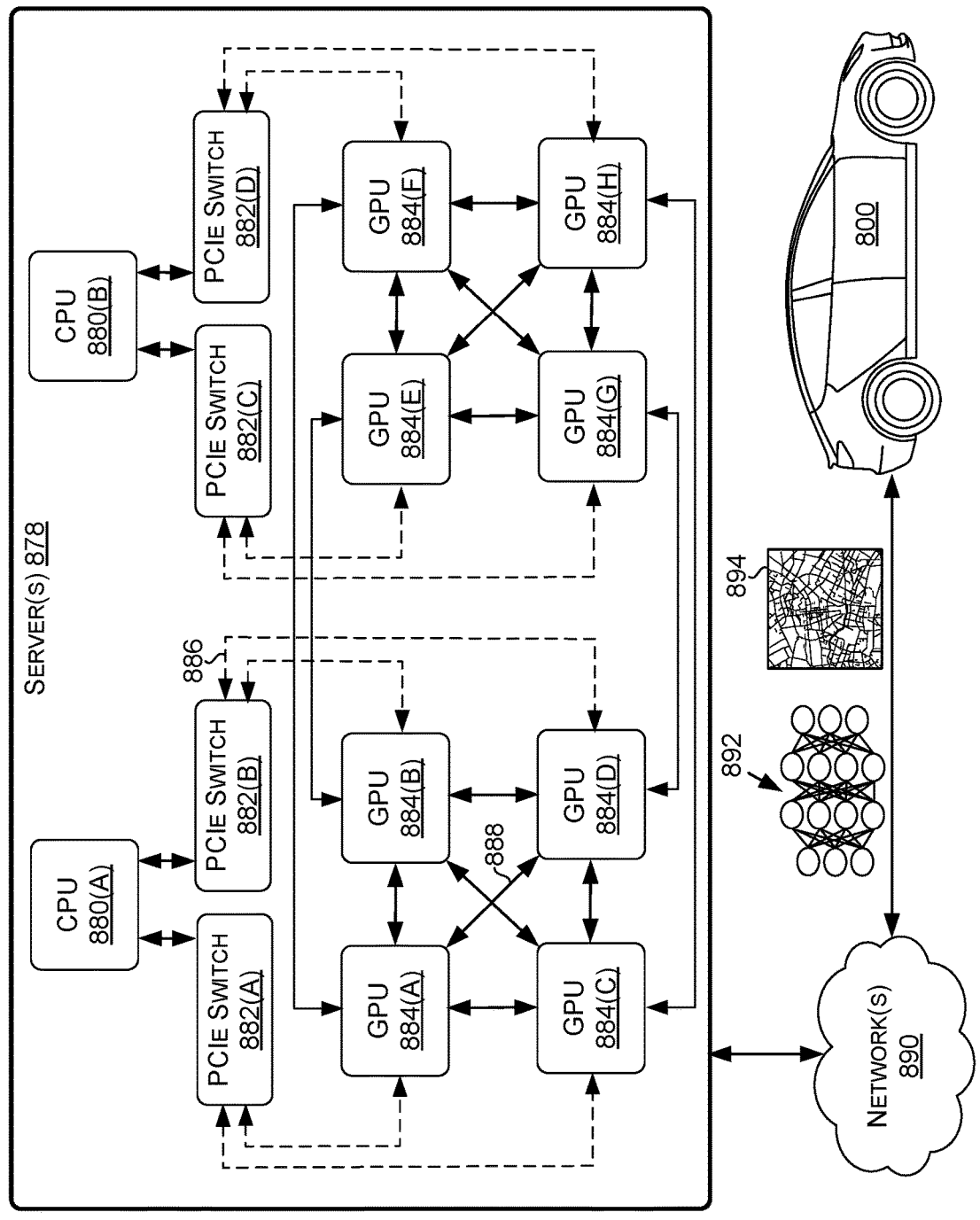
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
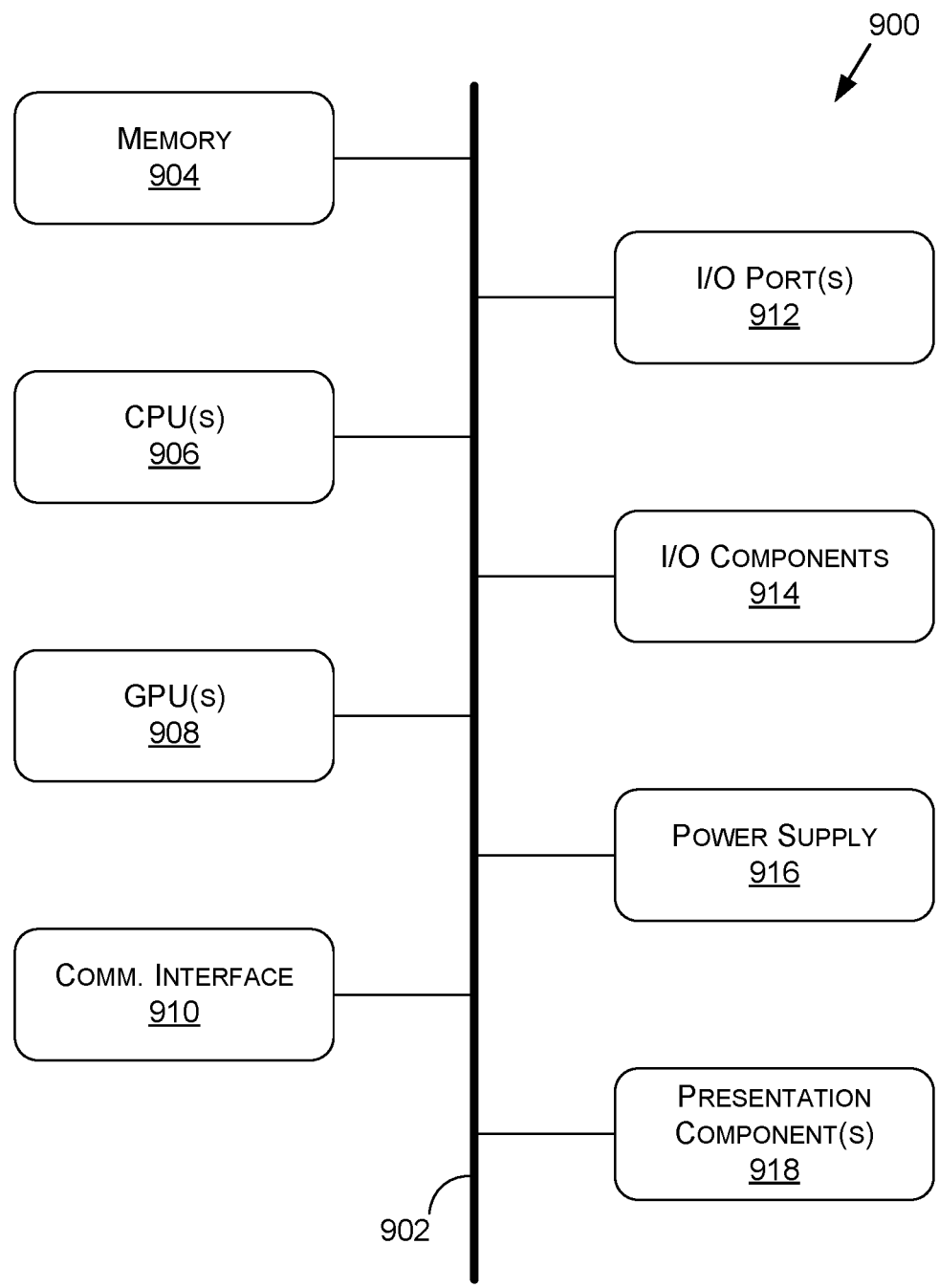
FIG. 9 is a block diagram of an example computing device suitable for use in implementing some embodiments of the present disclosure.

FIG. 9 is a block diagram of an example computing device 900 suitable for use in implementing some embodiments of the present disclosure. Computing device 900 may include a bus 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, and one or more presentation components 918 (e.g., display(s)).

Although the various blocks of FIG. 9 are shown as connected via the bus 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The bus 902 may represent one or more busses, such as an address bus, a data bus, a control bus, or a combination thereof. The bus 902 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 906 may be configured to execute the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an ARM processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

The GPU(s) 908 may be used by the computing device 900 to render graphics (e.g., 3D graphics). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data. The display memory may be included as part of the memory 904. The GPU(s) 708 may include two or more GPUs operating in parallel (e.g., via a link). When combined together, each GPU 908 may generate pixel data for different portions of an output image or for different output images (e.g., a first GPU for a first image and a second GPU for a second image). Each GPU may include its own memory, or may share memory with other GPUs.

In examples where the computing device 900 does not include the GPU(s) 908, the CPU(s) 906 may be used to render graphics.

The communication interface 910 may include one or more receivers, transmitters, and/or transceivers that enable the computing device 700 to communicate with other computing devices via an electronic communication network, included wired and/or wireless communications. The communication interface 910 may include components and functionality to enable communication over any of a number of different networks, such as wireless networks (e.g., WI-FI, Z-WAVE, BLUETOOTH, BLUETOOTH LE, ZIGBEE, etc.), wired networks (e.g., communicating over Ethernet), low-power wide-area networks (e.g., LORAWAN, SIGFOX, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   obtaining sensor data using one or more sensors of a machine navigating within a first lane of an intersection, the sensor data representing at least a sensor representation that corresponds to at least the first lane and a second lane of the intersection;
   determining, based at least on one or more neural networks processing the sensor data, at least first points of the sensor representation that are aligned along a first width of the first lane and second points of the sensor representation that are aligned along a second width of the second lane;
   generating a proposed path through the intersection based at least on connecting a first point of the first points that is substantially at a center of the first lane with a second point of the second points that is substantially at a center of the second lane; and
   causing the machine to navigate based at least on the proposed path.

2. The method of claim 1, further comprising:
   determining, based at least on the one or more neural networks processing the sensor data, at least one of a first classification associated with the first lane or a second classification associated with the second lane
   wherein the generating the proposed path is further based at least on the at least one of the first classification or the second classification.

3. The method of claim 1, further comprising:
   determining, based at least on the one or more neural networks processing the sensor data, at least one of one or more first classifications associated with the first points or one or more second classifications associated with the second points,
   wherein the generating the proposed path is further based at least on the at least one of the one or more first classifications or the one or more second classifications.

4. The method of claim 1, further comprising:
   determining, based at least on the one or more neural networks processing the sensor data, at least one of one or more first directions of travel associated with at least one of the first points or the first lane or one or more second directions of travel associated with at least one of the second points or the second lane,
   wherein the generating the proposed path is further based at least on the at least one of the one or more first directions of travel or the one or more second directions of travel.

5. The method of claim 1, further comprising:
   determining, based at least on the one or more neural networks processing the sensor data, at least one of a first shape associated with the first lane or a second shape associated with the second lane,
   wherein the generating the proposed path is further based at least on the at least one of the first shape and the second shape.

6. The method of claim 1, further comprising:
   converting one or more two-dimensional (2D) locations associated with the proposed path to one or more three-dimensional (3D) locations associated with the proposed path,
   wherein the causing the machine to navigate is based at least on the one or more 3D locations.

7. The method of claim 1, further comprising:
   generating a second proposed path through the intersection based at least on connecting the first point of the first points with a third point of the second points; and
   selecting the proposed path from among at least the proposed path or the second proposed path.

8. The method of claim 1, wherein the generating the proposed path through the intersection is based at least on connecting the first point to the second point within the sensor representation.

9. The method of claim 1, wherein the first points include first two-dimensional (2D) locations within the sensor representation and the second points include second 2D locations within the sensor representation.

10. The method of claim 1, further comprising:
    generating, by the one or more neural networks and based at least on processing the sensor data, output data representative of the first points of the sensor representation that correspond to the first lane for entering the intersection and the second points of the sensor representation that correspond to the second lane for exiting the intersection, wherein the determining the at least the first points of the sensor representation that are aligned along the first width of the first lane and the second points of the sensor representation that are aligned along the second width of the second lane is based at least on the output data.

11. An autonomous or semi-autonomous machine comprising:

one or more external sensors having one or more fields of view or one or more sensory fields external to the autonomous or semi-autonomous machine; and one or more processors to:

compute, based at least on one or more neural networks processing sensor data obtained using the one or more external sensors, data representative of three-dimensional (3D) locations associated with first points substantially aligned laterally along a first lane of an intersection and second points substantially aligned laterally along a second lane of the intersection;

determine a first point of the first points that is substantially located at a center of the first lane and a second point of the second points that is substantially located at a center of the second lane;

generate, based at least on the first point being substantially located at the center of the first lane and the second point being substantially located at the center of the second lane, a proposed path through the intersection based at least on connecting a first 3D location of the 3D locations that is associated with the first point to a second 3D location of the 3D locations that is associated with the second point; and cause the autonomous or semi-autonomous machine to navigate based at least on the proposed path.

12. The autonomous or semi-autonomous machine of claim 11, wherein the one or more processors are further to:

determine, based at least on the one or more neural networks processing the sensor data, at least one of a first classification associated with the first lane or a second classification associated with the second lane, wherein the proposed path is further generated based at least on the at least one of the first classification or the second classification.

13. The autonomous or semi-autonomous machine of claim 11, wherein the one or more processors are further to:

determine, based at least on the one or more neural networks processing the sensor data, at least one of one or more first directions of travel associated with at least one of the first point or the first lane or one or more second directions of travel associated with at least one of the second point or the second lane, wherein the proposed path is further generated based at least on the at least one of the one or more first directions of travel or the one or more second directions of travel.

14. The autonomous or semi-autonomous machine of claim 11, wherein the one or more processors are further to:

determine, based at least on the one or more neural networks processing the sensor data, at least one of a first shape associated with the first lane or a second shape associated with the second lane, wherein the proposed path is further generated based at least on the at least one of the first shape or the second shape.

15. The autonomous or semi-autonomous machine of claim 11, wherein the one or more processors are further to:

generate a second proposed path through the intersection based at least on connecting the first 3D location associated with the first point to a third 3D location of the 3D locations that is associated with a third point of the second points; and selecting the proposed path from among at least the proposed path or the second proposed path.

16. One or more processors comprising:

processing circuitry to:

obtain sensor data using one or more sensors of a machine, the sensor data representing at least a sensor representation that corresponds to a first lane and a second lane of an intersection;

determine, based at least on one or more neural networks processing the sensor data, at least first points of the sensor representation that are aligned along a first width of the first lane and second points of the sensor representation that are aligned along a second width of the second lane;

generate a proposed path through the intersection based at least on connecting a first point of the first points that is substantially at a center of the first lane with a second point of the second points that is substantially at a center of the second lane; and cause the machine to navigate based at least on the proposed path.

17. The one or more processors of claim 16, wherein the processing circuitry is further to:

determine, based at least on the one or more neural networks processing the sensor data, at least one of a first direction of travel associated with the first lane or a second direction of travel associated with the second lane, wherein the proposed path is further generated based at least on the at least one of the first direction of travel or the second direction of travel.

18. The one or more processors of claim 16, wherein the one or more processors are comprised in at least one of:

a control system for an autonomous or semi-autonomous machine;

a perception system for an autonomous or semi-autonomous machine;

a system for performing one or more simulation operations;

a system for performing one or more deep learning operations;

a system implemented using an edge device;

a system implemented using a robot;

a system for performing one or more generative AI operations;

a system for generating synthetic data;

a system incorporating one or more virtual machines (VMs);

a system implemented at least partially in a data center; or a system implemented at least partially using cloud computing resources.

19. The one or more processors of claim 16, wherein:

the first points correspond to the first lane for entering the intersection and the second points correspond to the second lane for exiting the intersection.

20. The one or more processors of claim 16, wherein:
the first points correspond to the first lane associated with a first side of the intersection and the second points correspond to the second lane associated with a second side of the intersection.

* * * * *